(12) United States Patent
Yoshimura et al.

(10) Patent No.: US 11,368,973 B2
(45) Date of Patent: Jun. 21, 2022

(54) TERMINAL APPARATUS, BASE STATION APPARATUS, AND COMMUNICATION METHOD WITH BEAM PARAMETERS INCLUDING QUASI CO-LOCATED ANTENNA PORT INDEXES

(71) Applicants: Sharp Kabushiki Kaisha, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 231 days.

(21) Appl. No.: 16/642,450

(22) PCT Filed: Sep. 4, 2018

(86) PCT No.: PCT/JP2018/032728
§ 371 (c)(1),
(2) Date: Feb. 27, 2020

(87) PCT Pub. No.: WO2019/045115
PCT Pub. Date: Mar. 7, 2019

(65) Prior Publication Data
US 2020/0260475 A1 Aug. 13, 2020

(30) Foreign Application Priority Data
Sep. 4, 2017 (JP) .............................. JP2017-169478

(51) Int. Cl.
*H04W 72/12* (2009.01)
*H04L 1/18* (2006.01)
(Continued)

(52) U.S. Cl.
CPC ....... *H04W 72/1289* (2013.01); *H04L 1/1812* (2013.01); *H04L 5/0048* (2013.01); *H04L 27/2613* (2013.01); *H04W 72/042* (2013.01)

(58) Field of Classification Search
CPC ............ H04W 72/1289; H04W 72/042; H04L 1/1812; H04L 5/0048; H04L 27/2613;
(Continued)

(56) References Cited

U.S. PATENT DOCUMENTS

2015/0016369 A1  1/2015  Park et al.
2015/0223209 A1  8/2015  Seo et al.

FOREIGN PATENT DOCUMENTS

JP    2015-511447 A    4/2015

OTHER PUBLICATIONS

Official Communication issued in International Patent Application No. PCT/JP2018/032728, dated Oct. 23, 2018.
(Continued)

*Primary Examiner* — Justin T Van Roie
(74) *Attorney, Agent, or Firm* — Keating & Bennett, LLP

(57) ABSTRACT

A terminal apparatus includes: a receiver configured to receive a PDCCH including a DCI format used for scheduling of a PDSCH, and the PDSCH; and a transmitter configured to transmit a HARQ-ACK on a PUCCH, wherein an index of a downlink reference signal quasi co-located (QCLed) with an antenna port of a downlink reference signal associated with the PDSCH is given based on a control resource set in which the PDCCH is detected.

4 Claims, 13 Drawing Sheets

(51) Int. Cl.
*H04L 5/00* (2006.01)
*H04L 27/26* (2006.01)
*H04W 72/04* (2009.01)

(58) Field of Classification Search
CPC ............. H04L 27/26025; H04L 27/261; H04L 5/0091; H04B 7/0695; H04B 7/088
See application file for complete search history.

(56) References Cited

OTHER PUBLICATIONS

NTT DOCOMO, "New SID Proposal: Study on New Radio Access Technology", 3GPP TSG RAN Meeting #71, RP-160671, Mar. 7-10, 2016, 8 pages.
Qualcomm Incorporated, "Control channel multi-beam operation", 3GPP TSG RAN WG1 #90, R1-1713420, Aug. 21-25, 2017, pp. 1-6.
Samsung, "HARQ-ACK Feedback Timing", 3GPP TSG RAN WG1 Meeting #90, R1-1713644, Aug. 21-25, 2017, pp. 1-3.
Nokia et al., "BPL definition and Spatial QCL time indication", 3GPP TSG RAN WG1#89, R1-1708906, May 15-19, 2017, 6 pages.
ZTE, "Discussion on beam indication", 3GPP TSG RAN WG1 Meeting #90, R1-1712298, Aug. 21-25, 2017, 7 pages.
Nokia et al., "Beam indication", 3GPP TSG-RAN WG1#90, R1-1714248, Aug. 21-25, 2017, 6 pages.
MediaTek Inc., "Details on DL Beam Management", 3GPP TSG RAN WG1 Meeting #89, R1-1707830, 8 pages.
Samsung, "Multibeam Transmission for PDCCH", 3GPP TSG RAN WG1 Meeting #90, R1-1713614, pp. 1-6.

Figure A: Table of number of OFDM symbols per slot $N^{symb,\mu}_{slot}$ for subcarrier spacing configuration $\mu$ and normal cyclic prefix

| $\mu$ | $N^{slot}_{symb}$ | slot_configuration | | | | |
|---|---|---|---|---|---|---|
| | | 0 | | 1 | | |
| | | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N^{symb,\mu}_{slot}$ for subcarrier spacing configuration $\mu$ and extended cyclic prefix

| $\mu$ | $N^{slot}_{symb}$ | slot_configuration | | | | |
|---|---|---|---|---|---|---|
| | | 0 | | 1 | | |
| | | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 2 | 12 | 40 | 4 | 6 | 80 | 8 |

FIG. 2

| Transmitted channel or signal | Identifier |
|---|---|
| CSI-RS | CSI-RS port index |
| SS block | SS block time index |
| PDCCH | CORESET and/or search space |
| PDSCH | PDSCH antenna port index |
| DL DMRS | DL DMRS antenna port index |
| DL PTRS | DL PTRS antenna port index |

FIG. 8

TERMINAL APPARATUS, BASE STATION APPARATUS, AND COMMUNICATION METHOD WITH BEAM PARAMETERS INCLUDING QUASI CO-LOCATED ANTENNA PORT INDEXES

TECHNICAL FIELD

The present invention relates to a terminal apparatus, a base station apparatus, and a communication method.

This application claims priority to JP 2017-169478 filed on Sep. 4, 2017, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by a base station apparatus. A single base station apparatus may manage multiple serving cells.

In the 3GPP, for proposal to International Mobile Telecommunication (IMT)-2020, which is a standard for next-generation mobile communication system developed by the International Telecommunications Union (ITU), a next-generation standard (New Radio (NR)) has been studied (NPL 1). The NR has been requested to meet requirements assuming three scenarios: enhanced Mobile BroadBand (eMBB), massive Machine Type Communication (mMTC), and Ultra Reliable and Low Latency Communication (URLLC) in a single technology framework.

In NR, a Physical Uplink Control CHannel (PUCCH) for a response to downlink transmission (for example, HARQ-ACK, etc.) has been studied (NPL 2, 3).

CITATION LIST

Non Patent Literature

NPL 1: "New SID proposal: Study on New Radio Access Technology," RP-160671, NTT docomo, 3GPP TSG RAN Meeting #71, Goteborg, Sweden, 7-10 Mar. 2016.
NPL 2: "Multi-beam control operation", R1-1713420, Qualcomm Incorporated, 3GPP TSG RAN Meeting #90, Prague, Czech Republic, 21-25 Aug. 2017.
NPL 3: "HARQ-ACK Feedback Timing", R1-1713644, Samsung, 3GPP TSG RAN Meeting #90, Prague, Czech Republic, 21-25 Aug. 2017.

SUMMARY OF INVENTION

Technical Problem

One aspect of the present invention provides a terminal apparatus for efficiently performing communication, a communication method used for the terminal apparatus, a base station apparatus for efficiently performing communication, and a communication method used for the base station apparatus.

Solution to Problem (1) A first aspect of the present invention is a terminal apparatus including: a receiver configured to receive a PDCCH including a DCI format used for scheduling of a PDSCH, and the PDSCH; and a transmitter configured to transmit a HARQ-ACK on a PUCCH, wherein an index of a downlink reference signal quasi co-located (QCLed) with an antenna port of a downlink reference signal associated with the PDSCH is given based on a control resource set in which the PDCCH is detected.

(2) A second aspect of the present invention is a base station apparatus including: a transmitter configured to transmit a PDCCH including a DCI format used for scheduling of a PDSCH, and the PDSCH; and a receiver configured to receive a HARQ-ACK on a PUCCH, wherein an index of a downlink reference signal quasi co-located (QCLed) with an antenna port of a downlink reference signal associated with the PDSCH is given based on a control resource set in which the PDCCH is detected.

(3) A third aspect of the present invention is a communication method used for a terminal apparatus, the communication method including the steps of: receiving a PDCCH including a DCI format used for scheduling of a PDSCH, and the PDSCH; and transmitting a HARQ-ACK on a PUCCH, wherein an index of a downlink reference signal quasi co-located (QCLed) with an antenna port of a downlink reference signal associated with the PDSCH is given based on a control resource set in which the PDCCH is detected.

(4) A fourth aspect of the present invention is a communication method used for a base station apparatus, the communication method including the steps of:

transmitting a PDCCH including a DCI format used for scheduling of a PDSCH, and the PDSCH; and receiving a HARQ-ACK on a PUCCH, wherein an index of a downlink reference signal quasi co-located (QCLed) with an antenna port of a downlink reference signal associated with the PDSCH is given based on a control resource set in which the PDCCH is detected.

(5) A fifth aspect of the present invention is a terminal apparatus including: a receiver configured to monitor a PDCCH in one or more CORESETs, and receive a PDSCH, based on detection of the PDCCH; and a transmitter configured to select one PUCCH resource from one PUCCH resource set, and transmit a HARQ-ACK for the PDSCH by using the one PUCCH resource, wherein the one PUCCH resource set is selected from multiple PUCCH resource sets associated with a PUCCH resource, based on at least some or all of a condition 1, a condition 2, a condition 3, a condition 4, and a condition 5, the condition 1 is a CORESET in which the PDCCH is detected, the condition 2 is a search space in which the PDCCH is detected, the condition 3 is a first beam parameter for the PDSCH, the condition 4 is a second beam parameter for the PDCCH, the condition 5 is a HARQ process ID associated with the PDSCH, and each of the multiple PUCCH resource sets includes one or more PUCCH resources.

(6) A sixth aspect of the present invention is a terminal apparatus including: a receiver configured to monitor a PDCCH in one or more CORESETs, and receive a PDSCH, based on detection of the PDCCH, wherein a first beam parameter for the PDSCH is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(7) A seventh aspect of the present invention is a terminal apparatus including: a receiver configured to monitor a PDCCH in one or more CORESETs, and receive a PDSCH, based on detection of the PDCCH, wherein one first beam parameter for the PDSCH is selected from one beam parameter set, the one beam parameter set is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(8) An eighth aspect of the present invention is a base station apparatus including: a transmitter configured to transmit a PDSCH, and transmit a PDCCH including scheduling information of the PDSCH in a CORESET; and a receiver configured to receive a PUCCH transmitted by using one PUCCH resource selected from one PUCCH resource set and including a HARQ-ACK for the PDSCH, wherein the one PUCCH resource set is selected from multiple PUCCH resource sets associated with a PUCCH resource, based on at least some or all of a condition 1, a condition 2, a condition 3, a condition 4, and a condition 5, the condition 1 is a CORESET in which the PDCCH is detected, the condition 2 is a search space in which the PDCCH is detected, the condition 3 is a first beam parameter for the PDSCH, the condition 4 is a second beam parameter for the PDCCH, the condition 5 is a HARQ process ID associated with the PDSCH, and each of the multiple PUCCH resource sets includes one or more PUCCH resources.

(9) A ninth aspect of the present invention is a base station apparatus including: a transmitter configured to transmit a PDSCH, and transmit a PDCCH including scheduling information of the PDSCH in a CORESET, wherein a first beam parameter for the PDSCH is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(10) A tenth aspect of the present invention is a base station apparatus including: a transmitter configured to transmit a PDSCH, and transmit a PDCCH including scheduling information of the PDSCH in a CORESET, wherein one first beam parameter for the PDSCH is selected from one beam parameter set, the one beam parameter set is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(11) An eleventh aspect of the present invention is a communication method used for a terminal apparatus, the communication method including the steps of: monitoring a PDCCH in one or more CORESETs, and receiving a PDSCH, based on detection of the PDCCH; and selecting one PUCCH resource from one PUCCH resource set, and transmitting a HARQ-ACK for the PDSCH by using the one PUCCH resource, wherein the one PUCCH resource set is selected from multiple PUCCH resource sets associated with a PUCCH resource, based on at least some or all of a condition 1, a condition 2, a condition 3, a condition 4, and a condition 5, the condition 1 is a CORESET in which the PDCCH is detected, the condition 2 is a search space in which the PDCCH is detected, the condition 3 is a first beam parameter for the PDSCH, the condition 4 is a second beam parameter for the PDCCH, the condition 5 is a HARQ process ID associated with the PDSCH, and each of the multiple PUCCH resource sets includes one or more PUCCH resources.

(12) A twelfth aspect of the present invention is a communication method used for a terminal apparatus, the communication method including the step of: monitoring a PDCCH in one or more CORESETs, and receiving a PDSCH, based on detection of the PDCCH, wherein a first beam parameter for the PDSCH is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(13) A thirteenth aspect of the present invention is a communication method used for a terminal apparatus, the communication method including the step of: monitoring a PDCCH in one or more CORESETs, and receiving a PDSCH, based on detection of the PDCCH, wherein one first beam parameter for the PDSCH is selected from one beam parameter set, the one beam parameter set is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(14) A fourteenth aspect of the present invention is a communication method used for a base station apparatus, the communication method including the steps of: transmitting a PDSCH, and transmitting a PDCCH including scheduling information of the PDSCH in a CORESET; and receiving a PUCCH transmitted by using one PUCCH resource selected from one PUCCH resource set and including a HARQ-ACK for the PDSCH, wherein the one PUCCH resource set is selected from multiple PUCCH resource sets associated with a PUCCH resource, based on at least some or all of a condition 1, a condition 2, a condition 3, a condition 4, and a condition 5, the condition 1 is a CORESET in which the PDCCH is detected, the condition 2 is a search space in which the PDCCH is detected, the condition 3 is a first beam parameter for the PDSCH, the condition 4 is a second beam parameter for the PDCCH, the condition 5 is a HARQ process ID associated with the PDSCH, and each of the multiple PUCCH resource sets includes one or more PUCCH resources.

(15) A fifteenth aspect of the present invention is a communication method used for a base station apparatus, the communication method including the step of: transmitting a PDSCH, and transmitting a PDCCH including scheduling information of the PDSCH in a CORESET, wherein a first beam parameter for the PDSCH is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(16) A sixteenth aspect of the present invention is a communication method used for a base station apparatus, the communication method including the step of: transmitting a PDSCH, and transmitting a PDCCH including scheduling information of the PDSCH in a CORESET, wherein one first beam parameter for the PDSCH is selected from one beam parameter set, the one beam parameter set is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

Advantageous Effects of Invention

According to one aspect of the present invention, the terminal apparatus can efficiently perform communication. The base station apparatus can efficiently perform communication.

BRIEF DESCRIPTION OF DRAWINGS

FIG. 2 is an example illustrating a relationship between $N^{slot}_{symb}$, subcarrier spacing configuration μ, slot configuration, and CP configuration according to one aspect of the present embodiment.

FIG. 8 is a diagram illustrating an example of relationships between downlink signals and their identifiers according to one aspect of the present embodiment.

DESCRIPTION OF EMBODIMENTS

Embodiments of the present invention will be described below.

Figure 1:
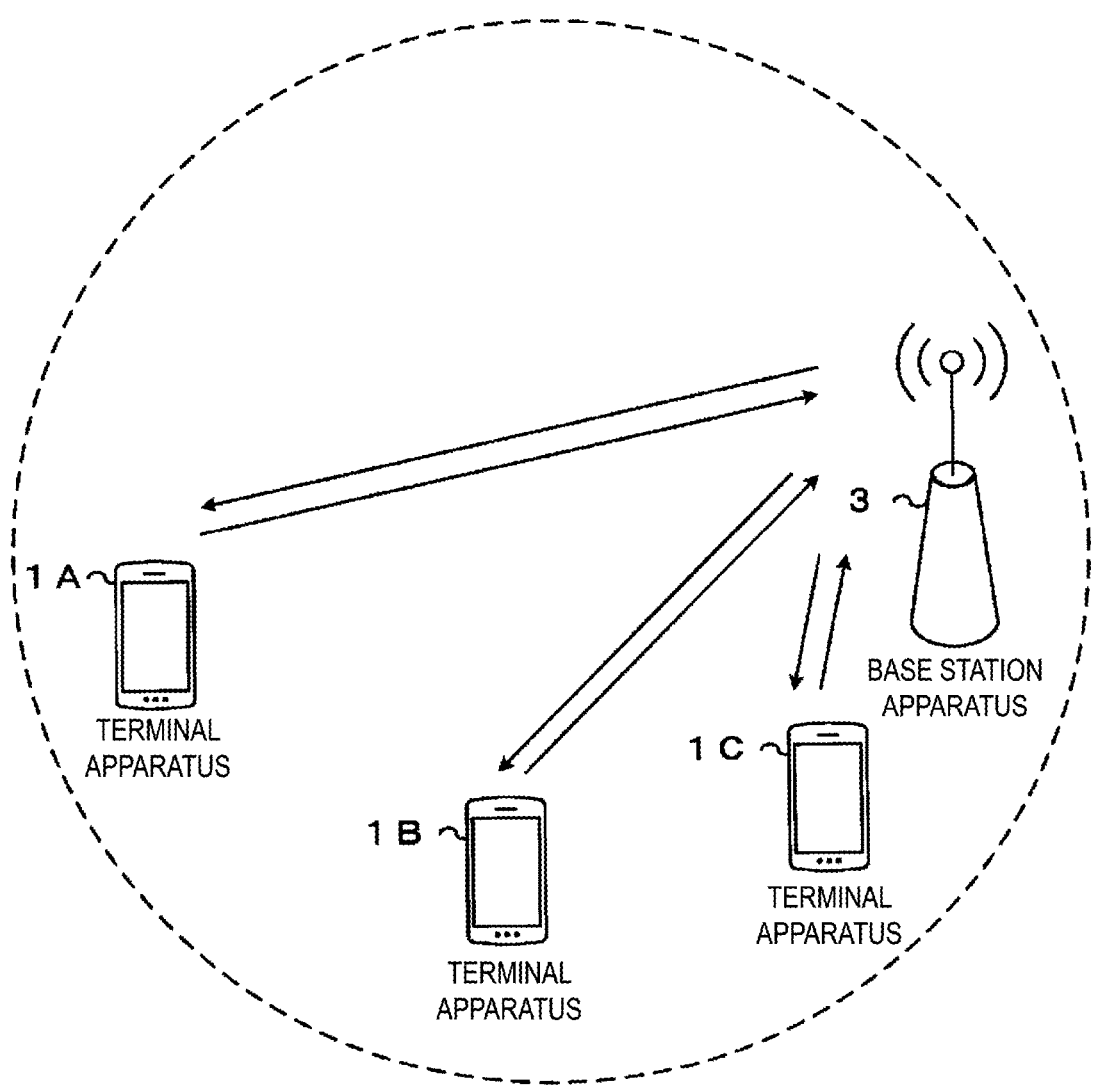
FIG. 1 is a conceptual diagram of a radio communication system according to one aspect of the present embodiment.

FIG. 1 is a conceptual diagram of a radio communication system according to one aspect of the present embodiment. In FIG. 1, a radio communication system includes terminal apparatuses 1A to 1C and a base station apparatus 3. Hereinafter, the terminal apparatuses 1A to 1C are also referred to as a terminal apparatus 1.

Hereinafter, a frame configuration will be described.

In the radio communication system according to an aspect of the present embodiment, at least Orthogonal Frequency Division Multiplex (OFDM) is used. OFDM symbols, which are units of the time domain of OFDM, include at least one or multiple subcarriers, and are converted to time-continuous signals (time-continuous signals) in baseband signal generation.

The SubCarrier Spacing (SCS) may be given by the subcarrier spacing $\Delta f = 2^\mu \ast 15$ kHz. For example, μ may be any of the values 0 to 5. For the Carrier bandwidth part, μ used for the configuration of subcarrier spacing may be given by higher layer parameters (subcarrier spacing configuration μ).

In the radio communication system according to an aspect of the present embodiment, a time unit $T_s$ is used for the representation of the length of the time domain. The time unit $T_s$ is given by $T_s = 1/(\Delta f_{max} \ast N_f)$. $\Delta f_{max}$ may be the maximum value of subcarrier spacing supported in the radio communication system according to an aspect of the present embodiment. $\Delta f_{max}$ may be $\Delta f_{max} = 480$ kHz. The time unit $T_s$ is also referred to as $T_s$. The constant κ is $\kappa = \Delta f_{max} \ast N_f/(\Delta f_{ref} N_{f,ref}) = 64$. $\Delta f_{ref}$ is 15 kHz, and $N_{f,ref}$ is 2048.

The constant κ may be a value indicating a relationship between the reference subcarrier spacing and $T_s$. The constant κ may be used for the length of the subframe. The number of slots included in the subframe may be given based on at least the constant κ. $\Delta f_{ref}$ is the reference subcarrier spacing, and $N_{f,ref}$ is the value corresponding to the reference subcarrier spacing.

The downlink transmission and/or the uplink transmission include a frame having the length of 10 ms. The frame includes 10 subframes. The length of subframe is 1 ms. The length of the frame may be a value that is independent of the subcarrier spacing Δf. That is, the configuration of the frame may be given not based on μ. The length of the subframe may be a value that is independent of the subcarrier spacing Δf. That is, the configuration of the subframe may be given not based on μ.

For the subcarrier spacing configuration μ, the number and indexes of slots included in the subframe may be given. For example, the first slot number $n^\mu_s$, may be given in ascending order ranging from 0 to $N^{subframe,\mu}_{slot}$ in the subframe. For the subcarrier spacing configuration μ, the number and indexes of slots included in the frame may be given. For example, the second slot number $n^\mu_{s,f}$ may be given in ascending order ranging from 0 to $N^{frame,\mu}_{slot}$ in the frame. $N^{slot}_{symb}$ continuous OFDM symbols may be included in one slot. $N^{slot}_{symb}$ may be given based on at least some or all of the slot configuration and Cyclic Prefix (CP) configuration. The slot configuration may be given by a higher layer parameter slot_configuration. The CP configuration may be given based on at least a higher layer parameter.

FIG. 2 is an example illustrating a relationship between $N^{slot}_{symb}$, subcarrier spacing configuration μ, slot configuration, and CP configuration according to one aspect of the present embodiment. In FIG. 2A, in a case that the slot configuration is 0 and the CP configuration is normal cyclic prefix (normal CP), $N^{slot}_{symb}=14$, $N^{frame,\mu}_{slot}=40$, $N^{subframe,\mu}_{slot}=4$. In FIG. 2B, in a case that the slot configuration is 0 and the CP configuration is extended cyclic prefix (extended CP), $N^{slot}_{symb}=12$, $N^{frame,\mu}_{slot}=40$, and $N^{subframe,\mu}_{slot}=4$. $N^{slot}_{symb}$ in the slot configuration being 0 may correspond to twice the $N^{slot}_{symb}$ in the slot configuration being 1.

A physical resource will be described below.

An antenna port is defined by the ability of a channel on which symbols are transmitted at one antenna port to be estimated from a channel on which other symbols are transmitted at the same antenna port. In a case that the large-scale property of a channel on which symbols are transmitted at one antenna port can be estimated from a channel on which symbols are transmitted at the other antenna port, the two antenna ports are called Quasi Co-Located (QCLed). The large-scale property may be a long term performance of the channel. The large-scale property may at least include some or all of delay spread, doppler spread, Doppler shift, average gain, average delay, and beam parameters (spatial Rx parameters). The first antenna port and the second antenna port being QCLed in terms of beam parameters may be that the receive beam assumed to be received by the receiving side with respect to the first antenna port and the receive beam assumed to be received by the receiving side with respect to the second antenna port are the same. The first antenna port and the second antenna port being QCLed in terms of beam parameters may be that the transmit beam assumed to be received by the receiving side with respect to the first antenna port and the transmit beam assumed to be received by the receiving side with respect to the second antenna port are the same. In a case that the large-scale property of a channel on which symbols are transmitted at one antenna port can be estimated from a channel on which symbols are transmitted at the other antenna port, the terminal apparatus 1 may assume that the two antenna ports are QCLed. The two antenna ports being QCLed may be that two antenna ports are assumed to be QCLed.

For each of the subcarrier spacing configuration and the set of carriers, a resource grid of $N^{\mu}_{RB,x} N^{RB}_{sc}$ subcarriers and $N^{(\mu)}_{symb} N^{subframe,\mu}_{symb}$ OFDM symbols is given. $N^{\mu}_{RB,x}$ may indicate the number of resource blocks given for the subcarrier spacing configuration $\mu$ for the carrier x. The carrier x indicates either a downlink carrier or an uplink carrier. In other words, x is "DL" or "UL". $N^{\mu}_{RB}$ is a naming including $N^{\mu}_{RB,DL}$, and $N^{\mu}_{RB,UL}$. $N^{RB}_{sc}$ may indicate the number of subcarriers included in one resource block. One resource grid may be given for each antenna port p, and/or for each subcarrier spacing configuration $\mu$, and/or for each transmission direction (Transmission direction) configuration. The transmission direction includes at least the DownLink (DL) and the UpLink (UL). Hereinafter, the set of parameters including at least some or all of the antenna port p, the subcarrier spacing configuration $\mu$, and the transmission direction configuration is also referred to as a first radio parameter set. That is, one resource grid may be given for each first radio parameter set.

Each element in a resource grid given for each first radio parameter set is referred to as a resource element. The resource element is identified by an index k of the frequency domain and an index l of the time domain. The resource element identified by the index k of the frequency domain and the index l of the time domain is also referred to as a resource element (k, l). The index k of the frequency domain indicates any value from 0 to $N^{\mu}_{RB} N^{RB}_{sc} - 1$. $N_{RB}$ may be the number of resource blocks given for the subcarrier spacing configuration $\mu$. $N^{RB}_{sc}$ is the number of subcarriers included in the resource block, and $N^{RB}_{sc}=12$. The index k of the frequency domain may correspond to a subcarrier index. The index l of the time domain may correspond to an OFDM symbol index.

Figure 3:
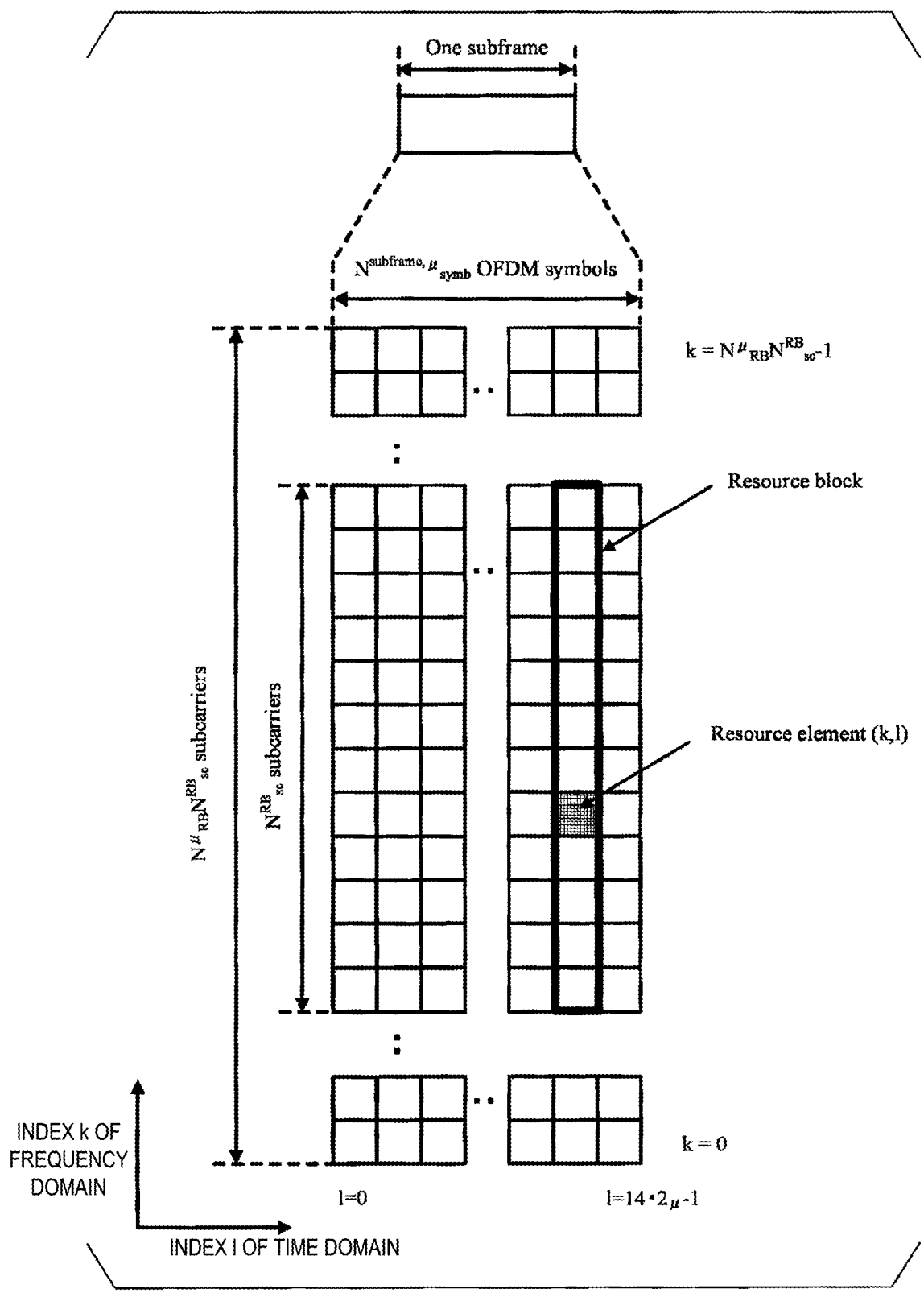
FIG. 3 is a schematic diagram illustrating an example of a resource grid in a subframe according to one aspect of the present embodiment.

FIG. 3 is a schematic diagram illustrating an example of a resource grid in a subframe according to one aspect of the present embodiment. In the resource grid of FIG. 3, the horizontal axis is the index l of the time domain, and the vertical axis is the index k of the frequency domain. In one subframe, the frequency domain of the resource grid may include $N^{\mu}_{RB} N^{RB}_{sc}$ subcarriers, and the time domain of the resource grid may include $14*2\mu-1$ OFDM symbols. The resource block includes $N^{RB}_{sc}$ subcarriers. The time domain of the resource block may correspond to one OFDM symbol. The time domain of the resource block may correspond to one or more slots. The time domain of the resource block may correspond to one subframe.

The terminal apparatus may be indicated to perform transmission and/or reception by using only a subset of the resource grid. The subset of the resource grid is also referred to as a carrier band part, and the carrier band part may be given by a higher layer parameter. That is, the terminal apparatus need not be indicated to perform transmission and/or reception by using all of the sets of the resource grid. In other words, the terminal apparatus may be indicated to perform transmission and/or reception by using some resources in the resource grid.

The higher layer parameter is a parameter included in higher layer signaling. The higher layer signaling may be a Radio Resource Control (RRC) signaling or a Media Access Control Element (MAC CE). Here, the higher layer signaling may be the RRC layer signaling or the MAC layer signaling.

Physical channels and physical signals according to various aspects of the present embodiment will be described.

The uplink physical channel may correspond to a set of resource elements carrying information generated in the higher layer. The uplink physical channel is a physical channel used in the uplink. In the radio communication system according to one aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes some or all of Channel State Information (CSI) of a downlink physical channel, Scheduling Request (SR), a Hybrid Automatic Repeat request ACKnowledgement (HARQ-ACK) for downlink data (Transport block (TB), Medium Access Control Protocol Data Unit (MAC PDU), Downlink-Shared Channel (DL-SCH), Physical Downlink Shared Channel (PDSCH)). The HARQ-ACK may indicate an acknowledgement (ACK) or a negative-acknowledgement (NACK) corresponding to the downlink data.

The HARQ-ACK may indicate an ACK or a NACK corresponding to each of one or more Code Block Group (CBGs) included in the downlink data. The HARQ-ACK is also referred to as HARQ feedback, HARQ information, HARQ control information, and ACK/NACK.

The scheduling request may be at least used to request PUSCH (Uplink-Shared Channel (UL-SCH)) resources for initial transmission.

The Channel State Information (CSI) includes at least a Channel Quality Indicator (CQI) and a Rank Indicator (RI). The channel quality indicator may include a Precoder Matrix Indicator (PMI). The CQI is an indicator associated with channel quality (propagation strength), and the PMI is an indicator for indicating a precoder. The RI is an indicator for indicating a transmission rank (or the number of transmission layers).

Four types of PUCCH formats may be given. PUCCH format 0 is a format of the PUCCH in which UCI is transmitted by selection of a sequence. In PUCCH format 0, a set of sequences for PUCCH format 0 is defined. The set of sequences for PUCCH format 0 includes one or more sequences for PUCCH format 0. From among the one or more sequences for PUCCH format 0, one sequence for PUCCH format 0 is selected, based on at least a block of bits. The sequence for PUCCH format 0 selected is mapped to the uplink physical channel and transmitted. The block of bits may be given by UCI. The block of bits may correspond to UCI. In PUCCH format 0, the number of bits $M_{bit}$ of the block of bits may be $M_{bit} < 3$. In PUCCH format 0, the number of OFDM symbols of the PUCCH may be 1 or 2.

The sequence for PUCCH format 0 selected may be multiplied by a prescribed power reducing factor (or amplitude reducing factor). The sequence for PUCCH format 0 selected is mapped in ascending order from the resource element (k, 1) for PUCCH format 0 in terms of k. The prescribed power reducing factor is at least used for transmit power control.

PUCCH format 1 is a format of the PUCCH in which UCI is transmitted by modulation of a sequence for PUCCH format 1. The block of bits may be modulated by Binary Phase Shift Keying (BPSK) in a case that the number of bits $M_{bit}$ included in the block of bits is $M_{bit}=1$, and a complex-valued modulation symbol d (0) may be generated. The block of bits may be modulated by Quadrature Phase Shift Keying (QPSK) in a case that the number of bits $M_{bit}$ included in the block of bits is $M_{bit}=2$, and a complex-valued modulation symbol d (0) may be generated. In PUCCH format 0, the number of bits $M_{bit}$ of the block of bits may be $M_{bit} < 3$. In PUCCH format 1, the number of OFDM symbols of the PUCCH may be 3 or greater. In PUCCH format 1, the number of OFDM symbols of the PUCCH may be 4 or greater.

The complex-valued modulation symbol d (0) may be multiplied with the sequence $r^{(\alpha p)}_{u,v}$ for PUCCH format 1 to generate the block of the complex-valued modulation symbol from $y^{(p)}$ (0) to $y^{(p)}$ ($N^{PUCCH}_{seq}-1$). The complex-valued modulation symbol d (0) may be multiplied with the sequence $r^{(\alpha p)}_{u,v}$ for PUCCH format 1 to generate the block of the complex-valued modulation symbol from $y^{(p)}$ (0) to $y^{(p)}$ ($N^{PUCCH}_{seq}-1$), based on Equation (1) below.

$$y^{(p)}(n) = d(0) \cdot r_{u,v}^{(\alpha p)}(n) \quad \text{Equation 1}$$

In Equation (1), n represents a value ranging from 0 to $N^{PUCCH}_{seq}-1$. $N^{PUCCH}_{seq}$ may correspond to the length of the sequence for PUCCH format 1.

The block of the complex-valued modulation symbols $y^{(p)}$ (0) to $y^{(p)}$ ($N^{PUCCH}_{seq}-1$) may be multiplied with the orthogonal sequence $w^{(p)}_n$ to generate an output sequence $z^{(p)}$ (n) for PUCCH format 1. The block of the complex-valued modulation symbols $y^{(p)}$ (0) to $y^{(p)}$ ($N^{PUCCH}_{seq}-1$) may be multiplied with the orthogonal sequence $w^{(p)}_n$ to generate an output sequence $z^{(p)}$ (n) for PUCCH format 1, based on Equation (2) below.

$$z^{(p)}(m \cdot N_{seq}^{PUCCH} + n) = w_n^{(p)}(m) \cdot y^{(p)}(n) \quad \text{Equation 2}$$

In Equation (2), m represents a value ranging from 0 to $N^{PUCCH}_{SF}-1$. In Equation (2), n represents a value ranging from 0 to $N^{PUCCH}_{seq}-1$. $N^{PUCCH}_{SF}$ may correspond to the length of the orthogonal sequence $w^{(p)}_n$ for PUCCH format 1.

The output sequence $z^{(p)}$ (n) for PUCCH format 1 may be multiplied with a prescribed power reducing factor. The output sequence $z^{(p)}$ (n) for PUCCH format 1 is mapped with frequency having priority from the resource element (k, 1) for PUCCH format 1, with the exception of a prescribed resource element. Mapping with frequency having priority is also referred to as frequency-first mapping. The frequency-first mapping may be being mapped first in ascending order with respect to k and then in ascending order with respect to 1. The prescribed resource element may include at least a UL DMRS associated with the PUCCH transmitted based on PUCCH format 1. The prescribed resource element may include at least a resource element in which the SRS is configured. The prescribed resource element may include at least a reservation resource. The reservation resource may be a resource not assumed by the terminal apparatus 1 that any signal has been transmitted and/or that no signal has been transmitted. The reservation resource may be a resource that is at least not assumed to transmit a channel by the terminal apparatus. The reservation resource may be a resource that is at least not assumed with channel measurement by the terminal apparatus. The reservation resource may be a resource that is at least not assumed to be allowed to transmit a channel by the terminal apparatus. The reservation resource configured based on at least a higher layer parameter may replace a configuration of the reservation resource indicated based on the DCI. In a case that the configuration of the reservation resource based on the higher layer parameter and the configuration of the reservation resource indicated based on the DCI are indicated for a prescribed resource, the configuration of the reservation resource indicated based on the DCI may be prioritized.

PUCCH format 2 is a format of the PUCCH in which UCI is transmitted by modulation of a sequence for PUCCH format 2. For the block of bits, for example, based on being modulated, an output sequence $z^{(p)}$ (n) for PUCCH format 2 may be generated. In PUCCH format 2, the number of bits $M_{bit}$ of the block of bits may be $M_{bit} > 2$. In PUCCH format 2, the number of OFDM symbols of the PUCCH may be 1 or 2.

The resource element mapping for PUCCH format 2 is similar to the resource element mapping for PUCCH format 1, and thus detailed description thereof is omitted.

PUCCH format 3 is a format of the PUCCH in which UCI is transmitted by modulation of a sequence for PUCCH format 3. For the block of bits, for example, based on being modulated, an output sequence $z^{(p)}$ (n) for PUCCH format 3 may be generated. In PUCCH format 3, the number of bits $M_{bit}$ of the block of bits may be $M_{bit} > 2$. In PUCCH format 3, the number of OFDM symbols of the PUCCH may be 3 or greater. In PUCCH format 3, the number of OFDM symbols of the PUCCH may be 4 or greater.

The resource element mapping for PUCCH format 3 is similar to the resource element mapping for PUCCH format 1, and thus detailed description thereof is omitted.

The PUSCH is used to transmit uplink data (TB, MAC PDU, UL-SCH, PUSCH). The PUSCH may be used to transmit HARQ-ACK and/or channel state information together with the uplink data. The PUSCH may be used to transmit only the channel state information or to transmit only the HARQ-ACK and the channel state information. The PUSCH is used to transmit random access message 3.

The PRACH is used to transmit a random access preamble (random access message 1). The PRACH is used for indicating initial connection establishment procedure, handover procedure, connection re-establishment procedure, synchronization (timing adjustment) for uplink data transmission, and a request for a PUSCH (UL-SCH) resource. The random access preamble may be used to notify the base station apparatus 3 of an index (random access preamble index) given by the higher layer of the terminal apparatus 1.

The random access preamble may be given by cyclic-shifting of a Zadoff-Chu sequence corresponding to a physical root sequence index u. The Zadoff-Chu sequence may be generated based on the physical root sequence index u. In a single serving cell, multiple random access preambles may be defined. The random access preamble may be identified based on at least the index of the random access preamble. Different random access preambles corresponding to different indices of random access preambles may correspond to different combinations of the physical root sequence index u and the cyclic shift. The physical root sequence index u and the cyclic shift may be given based on at least information included in the system information. The physical root sequence index u may be an index for identifying a sequence included in the random access preamble. The random access preamble may be identified based on at least the physical root sequence index u.

In FIG. 1, the following uplink physical signal is used for the uplink radio communication. The uplink physical signal need not be used for transmitting information output from the higher layer, but is used by the physical layer.

UpLink Demodulation Reference Signal (UL DMRS)
Sounding Reference Signal (SRS)
UpLink Phase Tracking Reference Signal (UL PTRS)

The UL DMRS is associated with transmission of the PUSCH and/or the PUCCH. The UL DMRS is multiplexed with the PUSCH or the PUCCH. The base station apparatus 3 may use the UL DMRS in order to perform channel compensation of the PUSCH or the PUCCH. Transmission of both of the PUSCH and the UL DMRS associated with the PUSCH is hereinafter referred to simply as transmission of the PUSCH. Transmission of both of the PUCCH and the UL DMRS associated with the PUCCH is hereinafter referred to simply as transmission of the PUCCH. The UL DMRS associated with the PUSCH is also referred to as the UL DMRS for the PUSCH. The UL DMRS associated with the PUCCH is also referred to as the UL DMRS for the PUCCH.

The SRS need not be associated with transmission of the PUSCH or the PUCCH. The base station apparatus 3 may use the SRS to measure the channel state. The SRS may be transmitted at the end of the subframe in an uplink slot or at an OFDM symbol of a prescribed number from the end.

The UL PTRS may be a reference signal that is at least used for phase tracking. The UL PTRS may be associated with a UL DMRS group that includes at least an antenna port used for one or more UL DMRSs. The UL PTRS being associated with the UL DMRS group may be that at least some or all of the antenna ports of the UL PTRS and the antenna ports of the UL DMRS group are QCLed. The UL DMRS group may be identified based on at least the antenna port of the lowest index in the UL DMRS included in the UL DMRS group.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast Channel (PBCH)
Physical Downlink Control Channel (PDCCH)
Physical Downlink Shared Channel (PDSCH)

The PBCH is used for transmitting a Master Information Block (MIB, a Broadcast Channel (BCH)). The PBCH may be transmitted based on a prescribed transmission interval. For example, the PBCH may be transmitted at an interval of 80 ms. Contents of information included in the PBCH may be updated at every 80 ms. The PBCH may include 288 subcarriers. The PBCH may include 2, 3, or 4 OFDM symbols. The MIB may include information relating to an identifier (index) of a synchronization signal. The MIB may include information for indicating at least a part of: the number of the slot in which PBCH is transmitted, the number of the subframe in which PBCH is transmitted, and the number of the radio frame in which PBCH is transmitted.

The PDCCH is used to transmit Downlink Control Information (DCI). The downlink control information is also referred to as a DCI format. The downlink control information may include at least either a downlink grant or an uplink grant. The downlink grant is also referred to as a downlink assignment or a downlink allocation.

A single downlink grant is used for at least scheduling of a single PDSCH in a single serving cell. The downlink grant is used at least for the scheduling of the PDSCH in the same slot as the slot in which the downlink grant is transmitted.

A single uplink grant is used at least for scheduling of a single PUSCH in a single serving cell.

One physical channel may be mapped to one serving cell. One physical channel may not be mapped to multiple serving cells.

One or more PUCCH groups may be configured for the terminal apparatus 1. One or more PUCCH resource sets may be configured for a PUCCH group including one or more serving cells. The PUCCH group includes at least one or more PUCCH resources. The PUCCH resources and/or the PUCCH resource set configured for one PUCCH group may be associated with one serving cell included in the PUCCH group.

Figure 4:
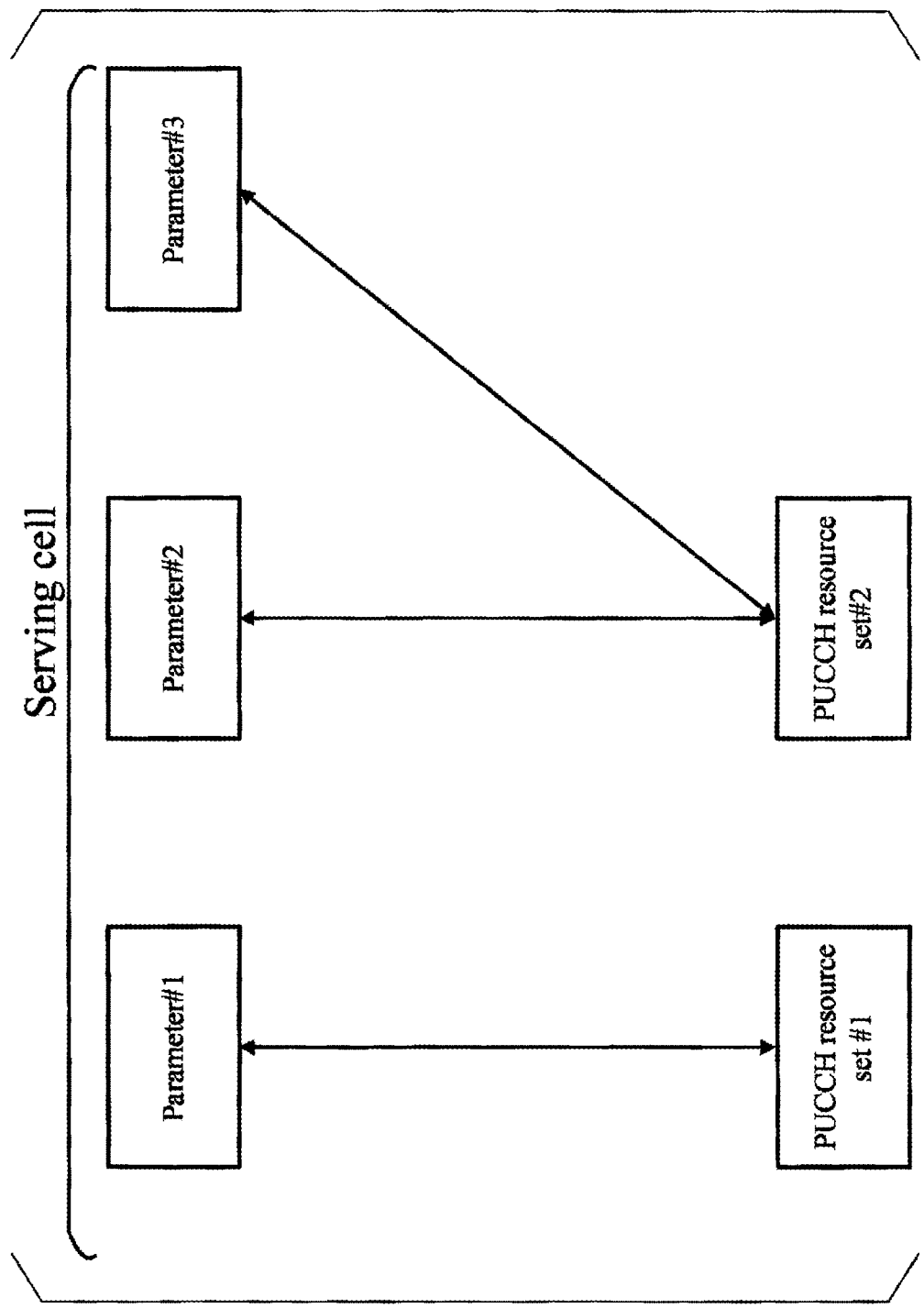
FIG. 4 is a diagram illustrating an example of a configuration of a PUCCH resource set in one serving cell according to one aspect of the present embodiment.

FIG. 4 is a diagram illustrating an example of a configuration of a PUCCH resource set in one serving cell according to one aspect of the present embodiment. In one example shown in FIG. 4, two PUCCH resource sets are configured in the serving cell, and one or multiple Parameters are associated with each of the PUCCH resource sets. Parameter #1 is associated with PUCCH resource set #1, and parameter #2 and parameter #3 are associated with PUCCH resource set #2. In other words, in a case that the parameter for the PDSCH is at least parameter #1, the PUCCH resource used for the HARQ-ACK for the PDSCH may be given by PUCCH resource set #1. In a case that the parameter for the PDCCH scheduling the PDSCH is at least parameter #1, the PUCCH resource used for the HARQ-ACK for the PDSCH may be given by PUCCH resource set #1. In a case that the parameter for the PDSCH is at least parameter #2 or parameter #3, the PUCCH resource used for the HARQ-ACK for the PDSCH may be given by PUCCH resource set #2. In a case that the parameter for the PDCCH scheduling the PDSCH is at least parameter #2 or parameter #3, the PUCCH resource used for the HARQ-ACK for the PDSCH may be given by PUCCH resource set #2. In other words, the parameter of the prescribed index being associated with the PUCCH resource set may be that the PUCCH resource used for transmission of the HARQ-ACK for the PDSCH identified by the parameter of the prescribed index is given by the PUCCH resource set.

Here, the parameter may include at least some or all of 1) a parameter to identify the control resource set in which the PDCCH used for the scheduling of the PDSCH is detected, 2) a parameter to identify the search space in which the PDCCH used for the scheduling of the PDSCH is detected, 3) an index to identify the first beam parameter for the PDSCH, 4) an index to identify the second beam parameter for the PDCCH used for the scheduling of the PDSCH, 5) a HARQ process ID associated with the PDSCH, and 6) an index to identify the third beam parameter for the PUCCH. The association of the PUCCH resource set and the parameters may be given based on at least the higher layer parameter.

Figure 5:
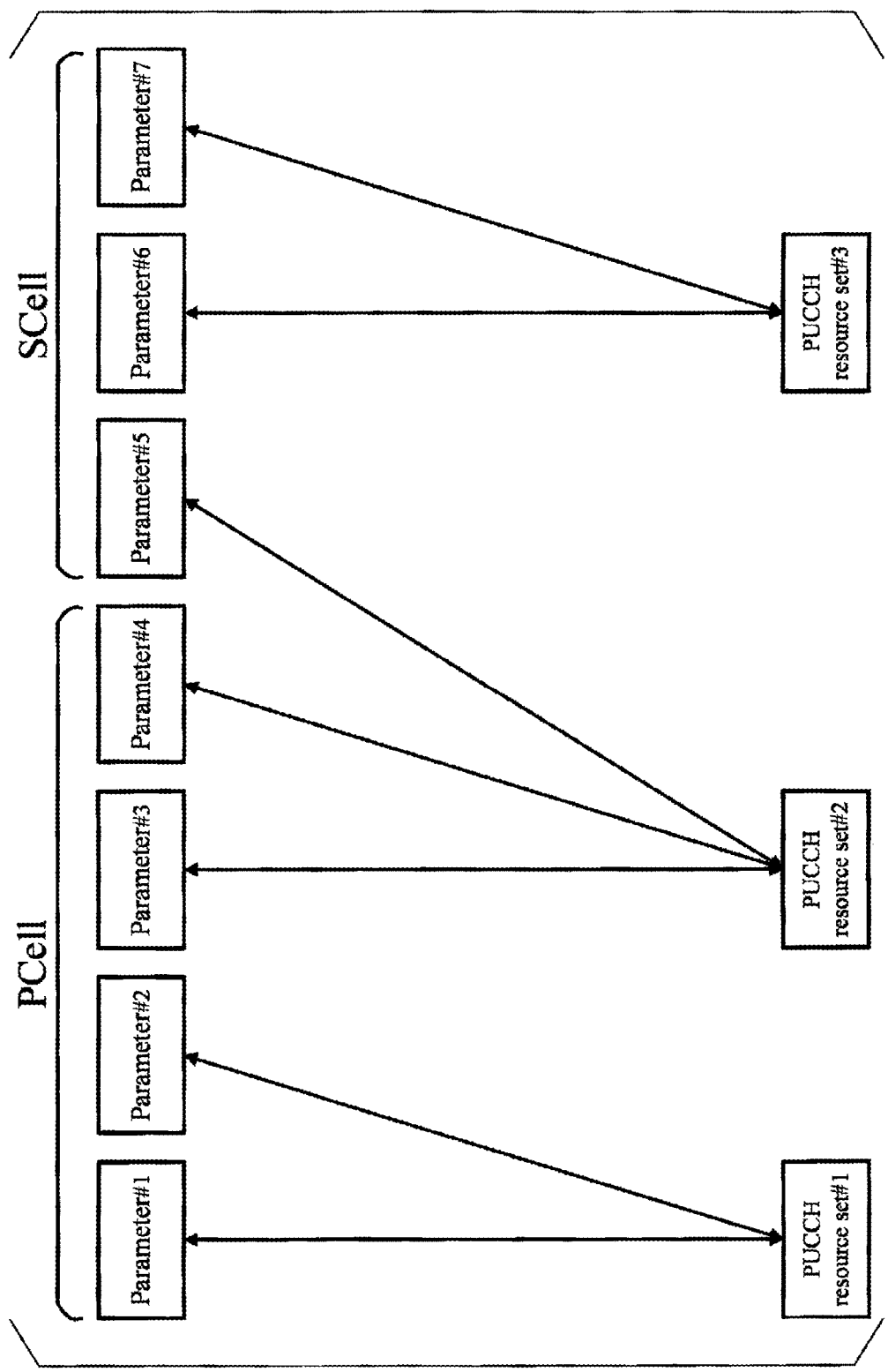
FIG. 5 is a diagram illustrating an example of a configuration of a PUCCH resource set in carrier aggregation according to one aspect of the present embodiment.

FIG. 5 is a diagram illustrating an example of a configuration of a PUCCH resource set in carrier aggregation according to one aspect of the present embodiment. In FIG. 5, each of a Primary cell (PCell) and a Secondary cell (SCell) are one serving cell, and the PCell and the SCell constitute one PUCCH group. For one PUCCH group, three PUCCH resource sets are configured, and one or more parameters are associated with each of the PUCCH resource sets. As illustrated in FIG. 5, at least some of the PUCCH resource sets may be associated with parameters for the PCell and parameters for the SCell. At least some of the PUCCH resource sets may be associated with parameters for multiple serving cells.

Figure 6:
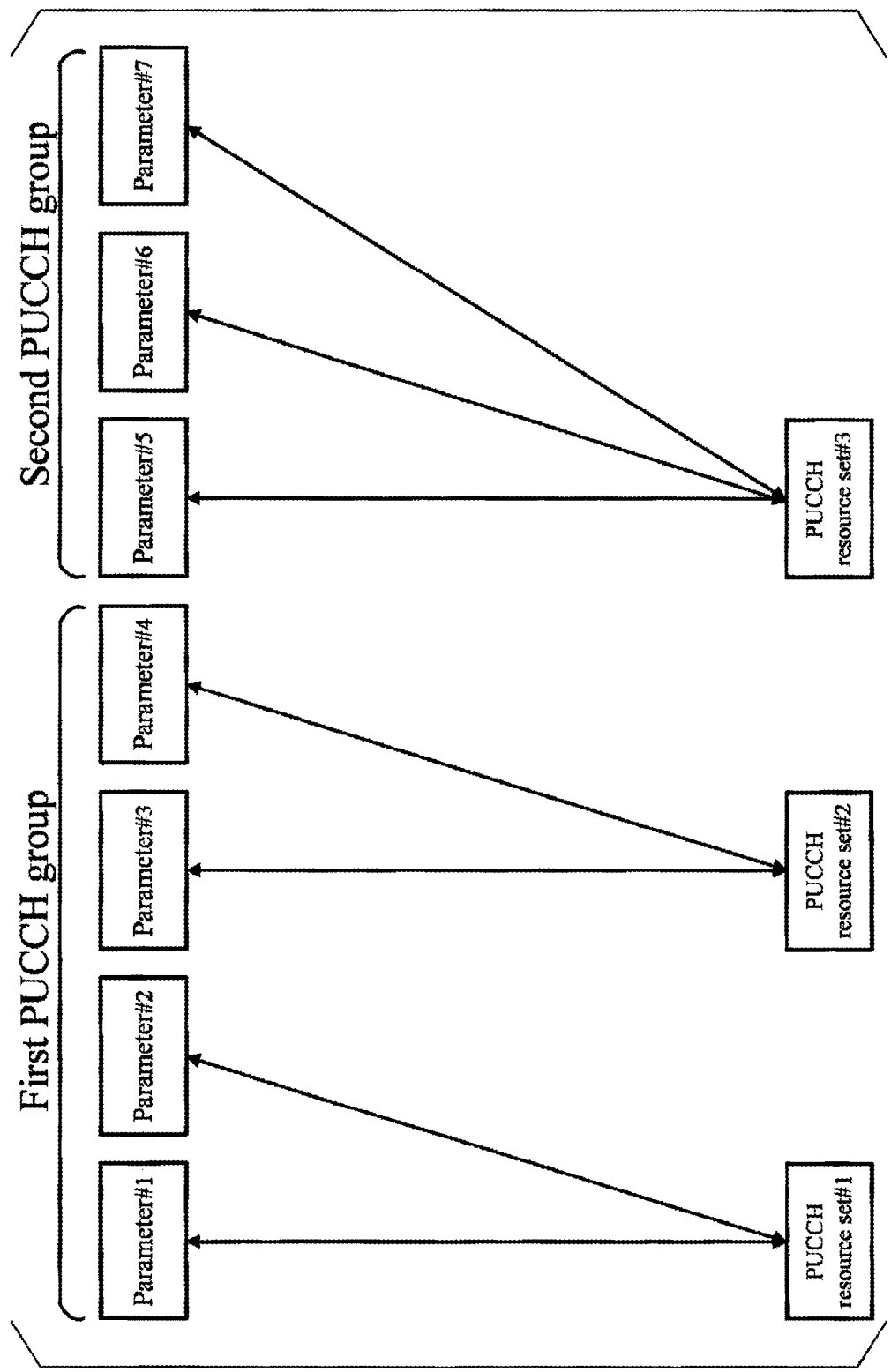
FIG. 6 is a diagram illustrating an example of a configuration of a PUCCH resource set in a case that two PUCCH groups are configured according to one aspect of the present embodiment.

FIG. 6 is a diagram illustrating an example of a configuration of a PUCCH resource set in a case that two PUCCH groups are configured according to one aspect of the present embodiment. In FIG. 6, two PUCCH resource sets are configured for a First PUCCH group and one PUCCH resource set is configured for a Second PUCCH group. In the first PUCCH group, PUCCH resource set #1 is associated with parameter #1 and parameter #2, and PUCCH resource set #2 is associated with parameter #3 and parameter #4. In the second PUCCH group, PUCCH resource set #3 is associated with parameter #5, parameter #6, and parameter #7. As illustrated in FIG. 6, a PUCCH resource set may be given individually for each PUCCH group. The association of the PUCCH resource set and the parameters for each PUCCH group may be given based on at least the higher layer parameter.

In Dual connectivity, the first PUCCH group may be a Primary Cell Group (PCG), and the second PUCCH group may be a Secondary Cell Group (SCG).

In the terminal apparatus 1, one or more control resource sets are configured for searching for PDCCH. The terminal apparatus 1 attempts to receive the PDCCH in the configured control resource set.

The control resource set may indicate a time frequency domain in which one or more PDCCHs can be mapped. The control resource set may be a region in which the terminal apparatus 1 attempts to receive the PDCCH. The control resource set may include a continuous resource (Localized resource). The control resource set may include non-continuous resources (distributed resources).

In the frequency domain, the unit of mapping the control resource sets may be a resource block. In the time domain, the unit of mapping the control resource sets may be the OFDM symbol.

The frequency domain of the control resource set may be identical to the system bandwidth of the serving cell. The frequency domain of the control resource set may be given based on at least the system bandwidth of the serving cell. The frequency domain of the control resource set may be given based on at least higher layer signaling and/or downlink control information.

The time domain of the control resource set may be given based on at least higher layer signaling and/or downlink control information.

The control resource set may include at least one or both of a Common control resource set and a Dedicated control resource set. The common control resource set may be a control resource set configured commonly to the multiple terminal apparatuses 1. The common control resource set may be given based on at least some or all of MIB, first system information, second system information, common RRC signaling, and cell ID. The dedicated control resource set may be a control resource set configured to be dedicatedly used for the terminal apparatus 1. The dedicated control resource set may be given based on at least some or all of dedicated RRC signaling and a value of C-RNTI.

The control resource set may be a set of PDCCHs (or PDCCH candidates) to be monitored by the terminal apparatus 1. The control resource set may include a set of PDCCHs (or PDCCH candidates) to be monitored by the terminal apparatus 1. The control resource set may include one or more Search Spaces (SS). The control resource set may be the search space.

The search space includes one or more PDCCH candidates. The terminal apparatus 1 receives a PDCCH candidate included in the search space and attempts to receive the PDCCH. Here, the PDCCH candidate is also referred to as a blind detection candidate.

The search space may include at least one or both of Common Search Space (CSS) and UE-specific Search Space (USS). The CSS may be a search space configured commonly to multiple terminal apparatuses 1. The USS may be a search space including a configuration to be dedicatedly used for the terminal apparatus 1. The CSS may be given based on at least some or all of MIB, first system information, second system information, common RRC signaling, and cell ID. The USS may be given based on at least some or all of dedicated RRC signaling and a value of C-RNTI.

The common control resource set may include at least one or both of the CSS and the USS. The dedicated control resource set may include at least one or both of the CSS and the USS. The dedicated control resource set need not include the CSS.

A physical resource of the search space includes a Control Channel Element (CCE) of the control channel. The CCE includes a prescribed number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

The PDSCH is used to transmit downlink data (DL-SCH, PDSCH). The PDSCH is at least used to transmit random access message 2 (random access response). The PDSCH is at least used to transmit the system information including parameters used for initial access.

The PDSCH is given based on at least some or all of Scrambling, Modulation, layer mapping, precoding, and Mapping to physical resource. The terminal apparatus 1 may assume that the PDSCH is given based on at least some or all of scrambling, modulation, layer mapping, precoding, and mapping to physical resource.

In scrambling, for the codeword q, the block of bits $b^{(q)}(i)$ may be scrambled based on at least the scrambling sequence $c^{(q)}(i)$ to generate $b^{(q)}_{sc}(i)$. In the block of bits $b^{(q)}(i)$, i represents a value ranging from 0 to $M^{(q)}_{bit}-1$. $M^{(q)}_{bit}$ may be the number of bits of the codeword q transmitted on the PDSCH. The scrambling sequence $c^{(q)}(i)$ may be a sequence given based on at least a pseudo-random function (for example, M sequence, Gold sequence, or the like). In the scrambling, for the codeword q, the block of bits $b^{(q)}(i)$ may be scrambled with the scrambling sequence $c^{(q)}(i)$, based on the following Equation (3), to generate the block of scramble bits $b^{(q)}_{sc}(i)$.

$$b^{(q)}_{sc}(i) = \mod(b^{(q)}(i) + c^{(q)}(i), 2) \quad \text{Equation 3}$$

mod (A, B) may be a function that outputs the remainder of A divided by B, mod (A, B) may be a function that outputs a value corresponding to the remainder of A divided by B.

In the modulation, for the codeword q, the block of scramble bits $b^{(q)}{}_{sc}$ (i) may be modulated based on a prescribed modulation scheme, to generate the block of complex-valued modulation symbols $d^{(q)}$ (i). The prescribed modulation scheme may include at least some or all of at least Quadrature Phase Shift Keying (QPSK), 16 Quadrature Amplitude Modulation (QAM), 64 QAM, and 256 QAM. Note that the prescribed modulation scheme may be given based on at least DCI scheduling the PDSCH.

In the layer mapping, the block of complex-valued modulation symbols for each codeword $d^{(q)}$ (i) may be mapped to one or multiple layers, based on a prescribed mapping procedure, and the block of complex-valued modulation symbols x (i) may be generated. The block of complex-valued modulation symbols x (i) may be x (i)=[$x^{(0)}$ (i) . . . $x^{(v-1)}$ (i)]. Here, v is the number of layers for the PDSCH.

In the precoding, the block of complex-valued modulation symbols x (i) may be precoded. In the precoding, the block of complex-valued modulation symbols x (i) may be converted to the block of complex-valued modulation symbols for v antenna ports x (i). The number of antenna ports for the PDSCH and the number of layers for the PDSCH may be the same.

In the mapping to physical resource (physical resource mapping), the block $x^{(p)}$ (i) of complex-valued modulation symbols for the antenna port p may be mapped with frequency having priority from the resource element (k, 1), except for resource elements that at least satisfy some or all of an element A to an element E below. Here, mapping with frequency having priority may be mapping as from k of the symbol 1 of the resource element (k, 1) to k+M (M is a prescribed value), from k of the symbol 1+1 to k+M, . . . , from k of the symbol 1+N (N is a prescribed value) to k+M, and the like. In the physical resource mapping, the block $x^{(p)}$ (i) of complex-valued modulation symbols for the antenna port p may be mapped with time having priority from the resource element (k, 1), except for resource elements that at least satisfy some or all of the element A to the element E below. Here, mapping with time having priority may be mapping as from the symbol 1 of the subcarrier index (resource element index) k of the resource element (k, 1) to 1+N (N is a prescribed value), from the symbol 1 of the subcarrier index k+1 to 1+N, . . . , from the symbol 1 of the subcarrier index k+M (M is a prescribed value) to 1+N, and the like. Element A) Resource element to which the DL DMRS associated with the PDSCH is mapped, Element B) Resource element to which the DL PTRS associated with the DL DMRS is mapped, Element C) Resource element in which the CSI-RS is configured, and/or the CSI-RS is transmitted, Element D) Resource element in which the SS block is configured, and/or the SS block is transmitted, and Element E) Reservation resource.

In FIG. 1, the following downlink physical signals are used for the downlink radio communication. The downlink physical signals need not be used for transmitting the information output from the higher layer, but are used by the physical layer.

Synchronization signal (SS)
DownLink DeModulation Reference Signal (DL DMRS)
Shared Reference Signal (Shared RS)
Channel State Information-Reference Signal (CSI-RS)
DownLink Phase Tracking Reference Signal (DL PTRS)
Tracking Reference Signal (TRS)

The synchronization signal is used for the terminal apparatus 1 to establish synchronization in the frequency domain and/or the time domain in the downlink. The synchronization signal includes a Primary Synchronization Signal (PSS) and a Secondary Synchronization Signal (SSS).

The SS block includes at least some or all of the PSS, the SSS, and the PBCH. The antenna ports of each of some or all of the PSS, the SSS, and the PBCH included in the SS block may be the same. Some or all of the PSS, the SSS, and the PBCH included in the SS block may be mapped to continuous OFDM symbols. The CP configurations of each of some or all of the PSS, the SSS, and the PBCH included in the SS block may be the same. The configuration µ of the subcarrier spacing of each of some or all of the PSS, the SSS, and the PBCH included in the SS block may be the same.

The DL DMRS is associated with transmission of the PBCH, the PDCCH, and/or the PDSCH. The DL DMRS is multiplexed with the PBCH, the PDCCH, or the PDSCH. In order to perform channel compensation of the PBCH, the PDCCH, or the PDSCH, the terminal apparatus 1 may use the DL DMRS corresponding to the PBCH, the PDCCH, or the PDSCH. Hereinafter, the transmission of the PBCH and the DL DMRS associated with the PBCH together is simply referred to as transmission of the PBCH. Hereinafter, the transmission of the PDCCH and the DL DMRS associated with the PDCCH together is simply referred to as transmission of the PDCCH. Hereinafter, the transmission of the PDSCH and the DL DMRS associated with the PDSCH together is simply referred to as transmission of the PDSCH. The DL DMRS associated with the PBCH is also referred to as the DL DMRS for the PBCH. The DL DMRS associated with the PDSCH is also referred to as the DL DMRS for the PDSCH. The DL DMRS associated with the PDCCH is also referred to as the DL DMRS associated with the PDCCH.

The Shared RS may be at least associated with transmission of the PDCCH. The Shared RS may be multiplexed with the PDCCH. The terminal apparatus 1 may use the Shared RS to perform channel compensation of the PDCCH. Hereinafter, the transmission of the PDCCH and the Shared RS associated with the PDCCH together is also simply referred to as transmission of the PDCCH.

The DL DMRS may be a reference signal which is individually configured for the terminal apparatus 1. The sequence of the DL DMRS may be given based on at least parameters individually configured for the terminal apparatus 1. The sequence of the DL DMRS may be given based on at least a UE-specific value (for example, C-RNTI, etc.). The DL DMRS may be individually transmitted for the PDCCH and/or the PDSCH. On the other hand, the Shared RS may be a reference signal which is commonly configured for multiple terminal apparatuses 1. The sequence of the Shared RS may be given regardless of parameters individually configured for the terminal apparatus 1. For example, the sequence of the Shared RS may be given based on at least some of the slot number, the mini-slot number, or the cell ID (identity). The Shared RS may be a reference signal which is transmitted regardless of whether the PDCCH and/or the PDSCH has been transmitted.

The CSI-RS may be at least a signal used for calculating the channel state information. The pattern of the CSI-RS assumed by the terminal apparatus may be given by at least a higher layer parameter.

The PTRS may be a signal that is at least used to compensate for phase noise. The pattern of the PTRS assumed by the terminal apparatus may be given based on at least the higher layer parameter and/or the DCI.

The DL PTRS may be associated with a DL DMRS group that includes at least an antenna port used for one or more DL DMRSs. The DL PTRS being associated with the DL DMRS group may be that at least some or all of the antenna ports of the DL PTRS and the antenna ports of the DL DMRS group are QCLed. The DL DMRS group may be identified based on at least the antenna port of the lowest index in the DL DMRS included in the DL DMRS group.

The TRS may be a signal that is at least used for time and/or frequency synchronization. The pattern of the TRS assumed by the terminal apparatus may be given based on at least the higher layer parameter and/or the DCI.

The downlink physical channel and the downlink physical signal are also referred to as a downlink signal. The uplink physical channel and the uplink physical signal are also referred to as an uplink signal. The downlink signal and the uplink signal are collectively referred to as a signal. The downlink physical channel and the uplink physical channel are collectively referred to as a physical channel. The downlink physical signal and the uplink physical signal are collectively referred to as a physical signal.

The BCH, the UL-SCH, and the DL-SCH are transport channels. The channel used in the Medium Access Control (MAC) layer is referred to as a transport channel. The unit of transport channels used in the MAC layer is also referred to as a transport block (TB) or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. The base station apparatus 3 and the terminal apparatus 1 may transmit and/or receive a MAC Control Element (CE) in the MAC layer. Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to the multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. The higher layer parameter specific in the serving cell may be transmitted by using the signaling common to the multiple terminal apparatuses 1 in the serving cell or the signaling dedicated to the certain terminal apparatus 1. The UE-specific higher layer parameter may be transmitted by using the signaling dedicated to the certain terminal apparatus 1. The PDSCH including the dedicated RRC signaling may be scheduled via the PDCCH in the first control resource set.

Broadcast Control CHannel (BCCH), Common Control CHannel (CCCH), and Dedicated Control CHannel (DCCH) are logical channels. For example, the BCCH is a higher-layer channel used to transmit the MIB. Moreover, the Common Control Channel (CCCH) is a higher-layer channel used to transmit information common to the multiple terminal apparatuses 1. Here, the CCCH is used for the terminal apparatus 1 which is not in an RRC-connected state, for example. Moreover, the Dedicated Control Channel (DCCH) is a higher-layer channel used to transmit individual control information (dedicated control information) to the terminal apparatus 1. Here, DCCH is used for the terminal apparatus 1 which is in an RRC-connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

An example of a communication method of the terminal apparatus 1 and the base station apparatus 3 will be described as follows. The terminal apparatus 1 is also referred to a User Equipment (UE) #1 below. The base station apparatus 3 may at least include a Transmission and Reception Point (TRP) #1 and/or TRP #2. The TRP #1 and the TRP #2 may be separate base station apparatuses 3. The terminal apparatus 1 and/or the base station apparatus 3 can transmit the physical channel and/or the physical signal by using the transmit beam (Tx beam). The terminal apparatus 1 and/or the base station apparatus 3 can receive the physical channel and/or the physical signal by using the reception beam (Rx beam).

Figure 7:
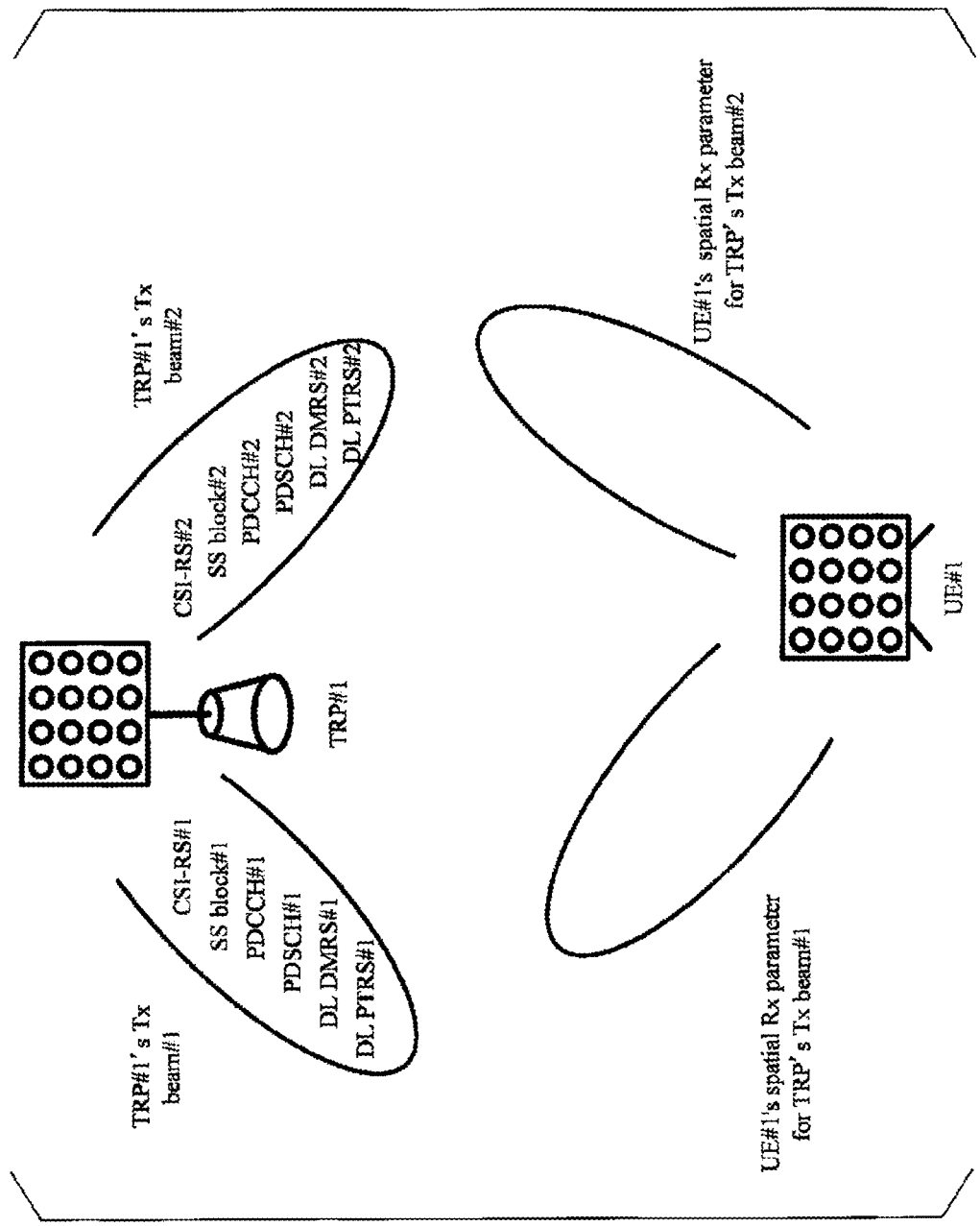
FIG. 7 is a diagram illustrating an example of a communication method of the TRP #1 and the UE #1 according to one aspect of the present embodiment.

FIG. 7 is a diagram illustrating an example of a communication method of the TRP #1 and the UE #1 according to one aspect of the present embodiment. In FIG. 7, the TRP #1 uses the Tx beam #1 to transmit at least some or all of the CSI-RS #1, the SS block #1, the PDCCH #1, the PDSCH #1, the DL DMRS #1, and the DL PTRS #1. Using the same Tx beam to transmit one or multiple downlink signals may be that each antenna port of one or multiple downlink signals is at least QCLed in terms of the beam parameters. The UE #1 receives at least some or all of the CSI-RS #1, the SS block #1, the PDCCH #1, the PDSCH #1, the DL DMRS #1, and the DL PTRS #1, based on at least the beam parameters for the Tx beam #1. On the other hand, in FIG. 7, the TRP #1 uses the Tx beam #2 to transmit at least some or all of the CSI-RS #2, the SS block #2, the PDCCH #2, the PDSCH #2, the DL DMRS #2, and the DL PTRS #2. The UE #1 receives at least some or all of the CSI-RS #2, the SS block #2, the PDCCH #2, the PDSCH #2, the DL DMRS #2, and the DL PTRS #2, based on at least the beam parameters for the Tx beam #2.

FIG. 8 is a diagram illustrating an example of relationships between downlink signals and their identifiers according to one aspect of the present embodiment. As illustrated in FIG. 8, the CSI-RS may be identified based on at least the CSI-RS antenna port index (CSI-RS port index). The SS block may also be identified based on at least the SS block time identifier (SS block time index). The PDCCH may be identified based on at least the control resource set in which the PDCCH is detected and/or the search space in which the PDCCH is detected. The PDSCH may be identified based on at least the PDSCH antenna port index (PDSCH port index).

The DL DMRS may be identified based on at least the DL DMRS antenna port index (DL DMRS port index). The DL PTRS may be identified based on at least the DL PTRS antenna port index (DL PTRS port index).

By associating the identifier and the beam parameter given to each of the downlink signals, the UE #1 can receive the downlink signal by using the appropriate beam.

Figure 9:
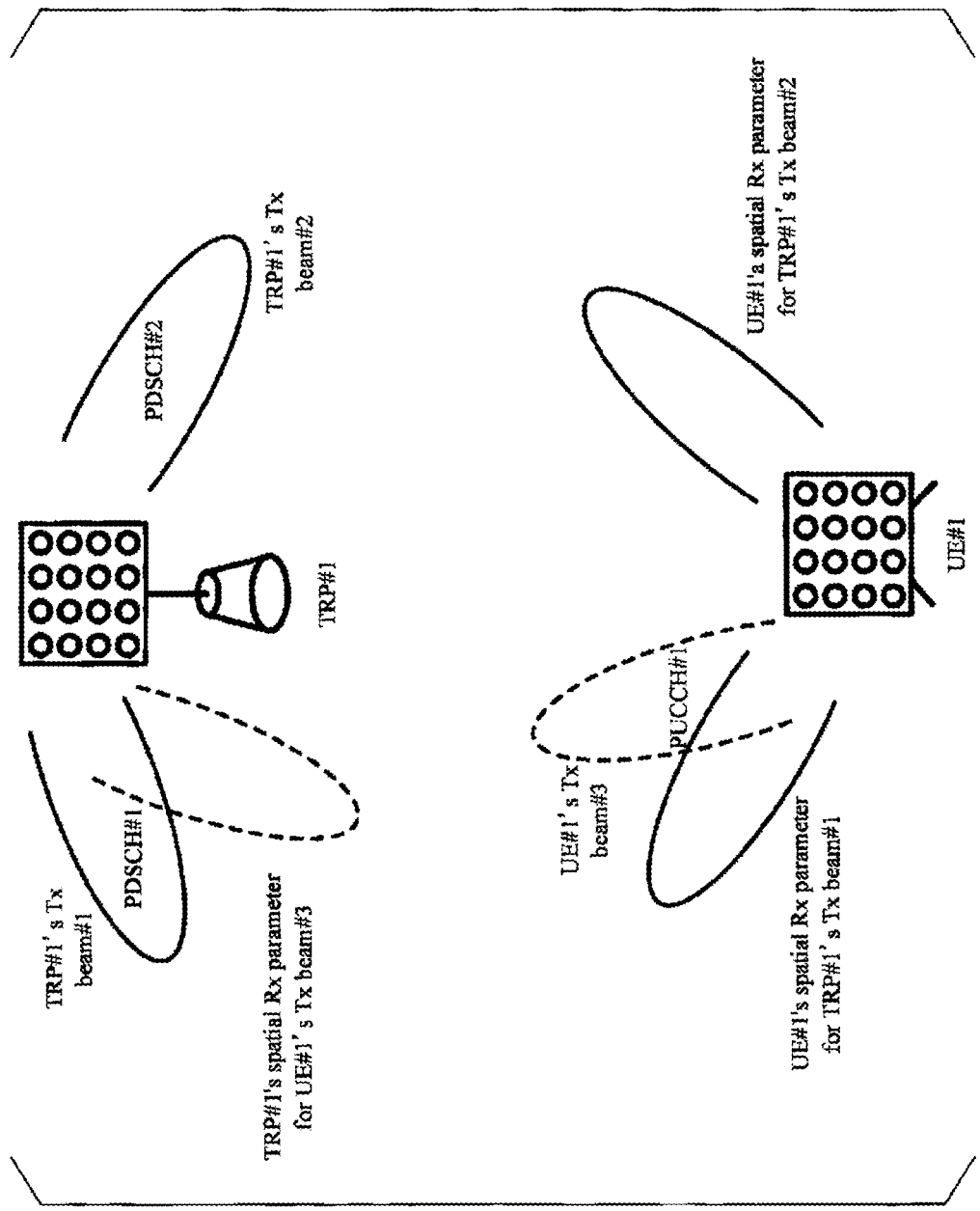
FIG. 9 is a diagram illustrating an example of a communication method of the TRP #1 and the UE #1 according to one aspect of the present embodiment.

FIG. 9 is a diagram illustrating an example of a communication method of the TRP #1 and the UE #1 according to one aspect of the present embodiment. In FIG. 9, the TRP #1 transmits the PDSCH #1 by using the Tx beam #1, and the UE #1 receives the PDSCH #1, based on the beam parameters of the Tx beam #1. The TRP #1 transmits the PDSCH #2 by using the Tx beam #2, and the UE #1 receives the PDSCH #2, based on the beam parameters of the Tx beam #2. The PUCCH #1 including the HARQ-ACK #1 for the PDSCH #1 and the HARQ-ACK #2 for the PDSCH #2 are transmitted by using the Tx beam #3, and the TRP #1 receives the PUCCH #1. Multiple PDSCHs transmitted based on different beam parameters may be transmitted on the PUCCH by using the same Tx beam.

Figure 10:
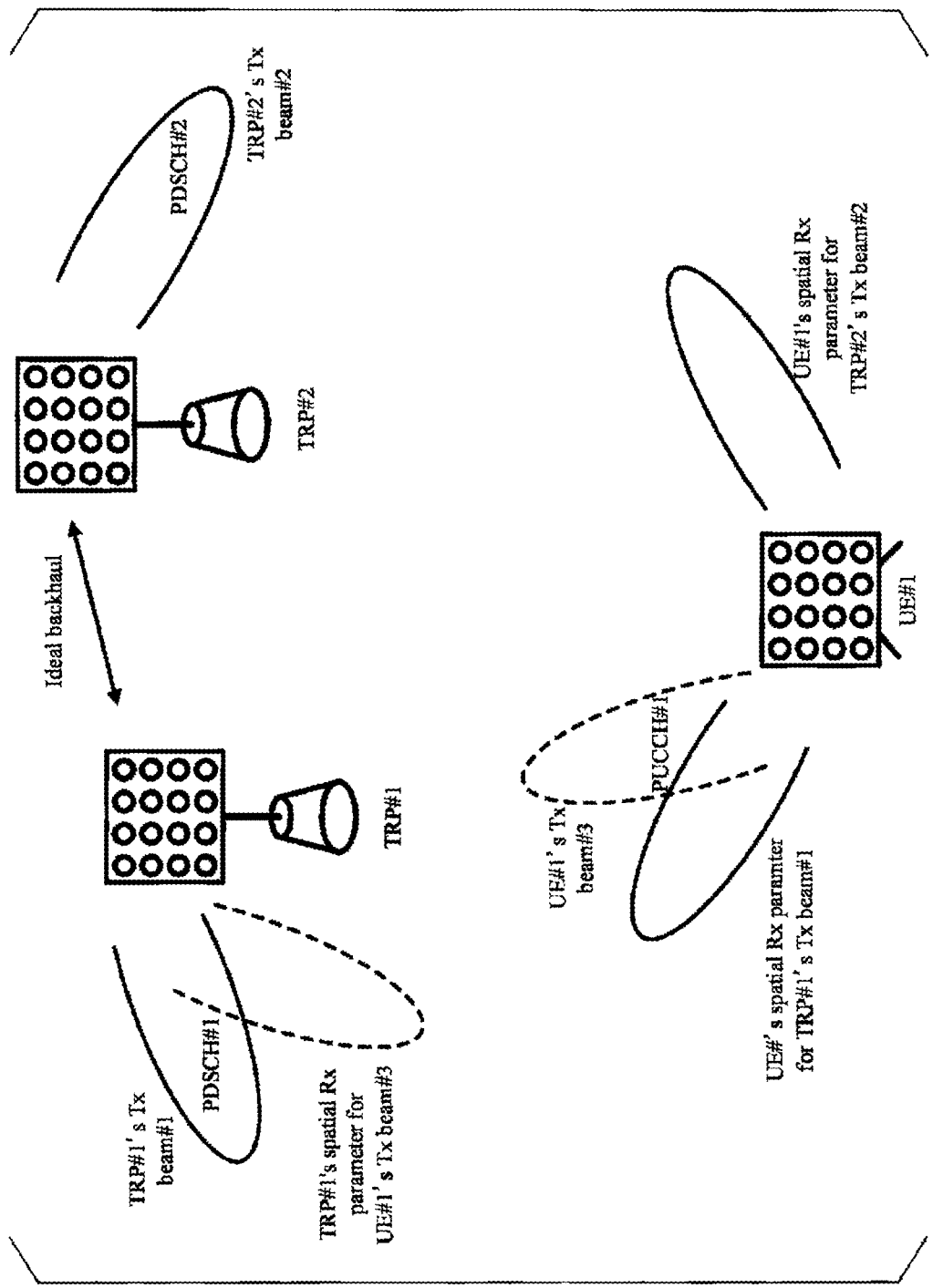
FIG. 10 is a diagram illustrating an example of a communication method of the TRP #1, the TRP #2, and the UE #1 according to one aspect of the present embodiment.

FIG. 10 is a diagram illustrating an example of a communication method of the TRP #1, the TRP #2, and the UE #1 according to one aspect of the present embodiment. In FIG. 10, the TRP #1 and the TRP #2 are connected with an Ideal backhaul. In FIG. 10, the TRP #1 transmits the PDSCH #1 by using the Tx beam #1, and the UE #1 receives the PDSCH #1, based on the beam parameters of the Tx beam #1. The TRP #2 transmits the PDSCH #2 by using the Tx beam #2, and the UE #1 receives the PDSCH #2, based on the beam parameters of the Tx beam #2. The PUCCH #1 including the HARQ-ACK #1 for the PDSCH #1 and the HARQ-ACK #2 for the PDSCH #2 are transmitted by using the Tx beam #3, and the TRP #1 receives the PUCCH #1. The TRP #2 may perform preferable scheduling, based on receiving the HARQ-ACK #2 received by the TRP #1 via the ideal backhaul. Here, the ideal backhaul may be that the TRP #1 and the TRP #2 share the higher layer parameter configuration, uplink transmission/downlink transmission timing, and HARQ-ACK contents from the UE. In other words, the TRP #1 and the TRP #2 may cooperate via the ideal backhaul to schedule one UE uplink transmission/downlink transmission.

Figure 11:
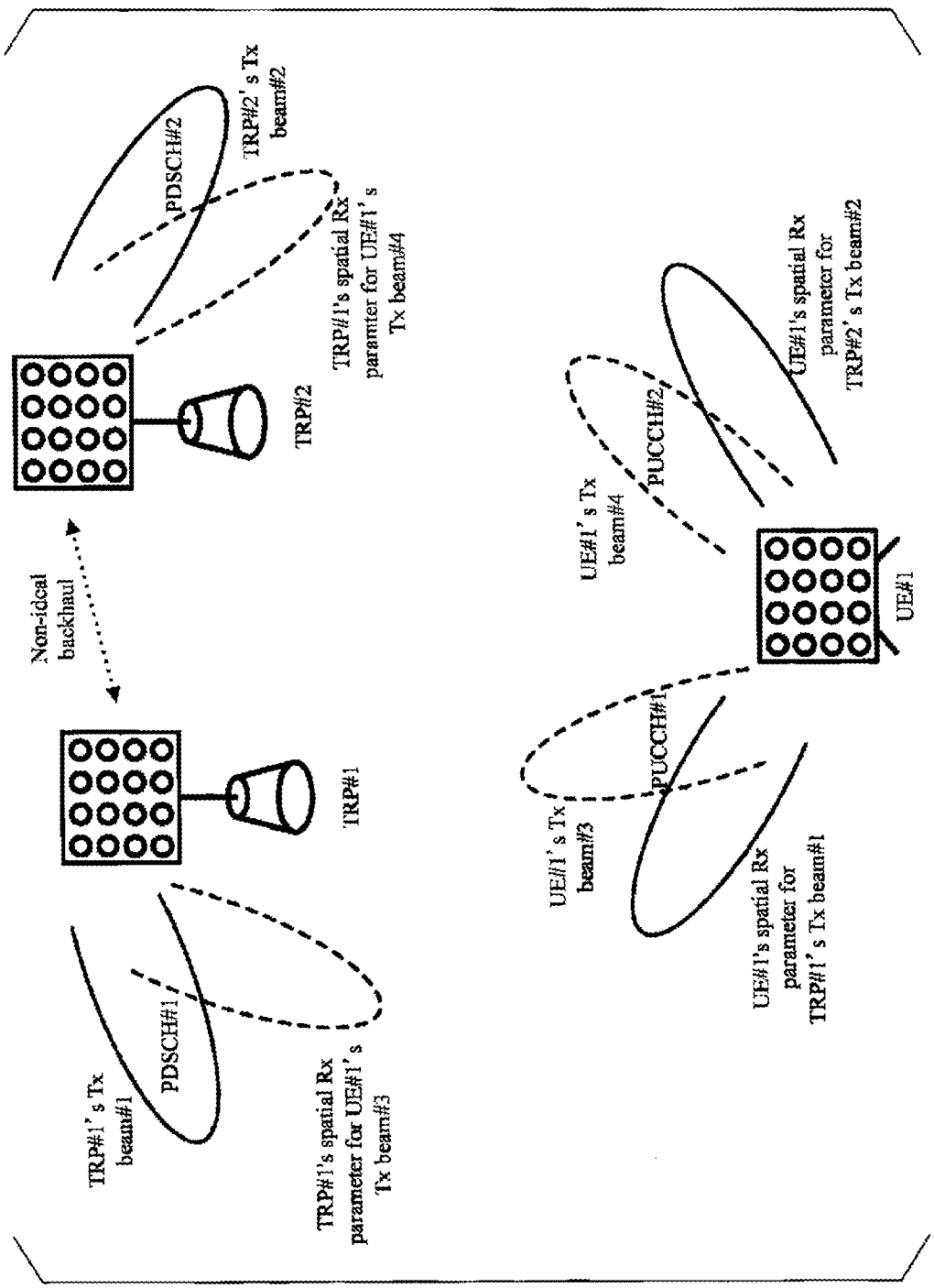
FIG. 11 is a diagram illustrating an example of a communication method of the TRP #1, the TRP #2, and the UE #1 according to one aspect of the present embodiment.

FIG. 11 is a diagram illustrating an example of a communication method of the TRP #1, the TRP #2, and the UE #1 according to one aspect of the present embodiment. In FIG. 11, the TRP #1 and the TRP #2 are connected with a Non-ideal backhaul. It is assumed that the non-ideal backhaul does not necessarily provide a complete backhaul link. For example, in a non-ideal backhaul, an environment is assumed in which PDSCH scheduling information, HARQ-ACK, and the like are not guaranteed to be exchanged at high speed. That is, the TRP #1 and the TRP #2 connected via the non-ideal backhaul preferably independently perform at least a part of scheduling of the PDSCH, and preferably receive the HARQ-ACK of the PDSCH.

In FIG. 11, the TRP #1 transmits the PDSCH #1 by using the Tx beam #1, and the UE #1 receives the PDSCH #1, based on the beam parameters of the Tx beam #1. The TRP #2 transmits the PDSCH #2 by using the Tx beam #2, and the UE #1 receives the PDSCH #2, based on the beam parameters of the Tx beam #2. The PUCCH #1 including the HARQ-ACK #1 for the PDSCH #1 is transmitted by using the Tx beam #3, and the TRP #1 receives the PUCCH #1. The PUCCH #2 including the HARQ-ACK #2 for the PDSCH #2 is transmitted by using the Tx beam #4, and the TRP #2 receives the PUCCH #2.

As illustrated in FIG. 11, in the non-ideal backhaul environment, it is preferable for a physical channel including at least a HARQ-ACK to be generated and transmitted for each TRP. In the non-ideal backhaul, HARQ processes may be configured for each TRP and scheduling may be performed for the UE for TRP individually.

An example of operations of the terminal apparatus 1 will be described below.

The terminal apparatus 1 may transmit a PUCCH including at least a HARQ-ACK of a PDSCH by using one PUCCH resource given by one PUCCH resource set. Here, the one PUCCH resource set may be given from multiple PUCCH resource sets, based on at least some or all of following condition 1 to condition 6.

Condition 1) Control resource set in which a PDCCH used for scheduling the PDSCH is detected Condition 2) Search Space in which a PDCCH used for scheduling of the PDSCH is detected Condition 3) First beam parameter for the PDSCH Condition 4) Second beam parameter for the PDCCH Condition 5) HARQ process ID associated with the PDSCH Condition 6) Third beam parameter for the PUCCH Here, each of the one or more PUCCH resource sets may be given based on at least the higher layer parameter. The first beam parameter for the PDSCH may be given based on at least the higher layer parameter. The second beam parameter for the PDCCH may be given based on at least the higher layer parameter. The third beam parameter for the PUCCH may be given based on at least the higher layer parameter.

Here, in one PUCCH group, the one PUCCH resource set may be given from multiple PUCCH resource sets, based on at least some or all of the condition 1 to the condition 6. In other words, for each PUCCH group, the one PUCCH resource set may be given from multiple PUCCH resource sets, based on at least some or all of the condition 1 to the condition 6.

Here, each of the multiple PUCCH resource sets may be a set including at least one or more PUCCH resources. The one or more PUCCH resources may indicate one or more resource blocks used for transmission of the PUCCHs, and/or one or more resource elements used for transmission of the PUCCHs. The one or more PUCCH resources may indicate at least one or more resource elements (k, l) for PUCCH format 0. The one or more PUCCH resources may indicate at least one or more resource elements (k, l) for PUCCH format 1. The one or more PUCCH resources may indicate at least one or more resource elements (k, l) for PUCCH format 2. The one or more PUCCH resources may indicate at least one or more resource elements (k, l) for PUCCH format 3.

The PUCCH resource may indicate at least the start OFDM symbol of the PUCCH in the slot. The PUCCH resource may indicate at least an index of the slot. The PUCCH resource may indicate at least the number of slots to which the PUCCH is mapped. The PUCCH resource may indicate at least the number of OFDM symbols to which the PUCCH is mapped. The PUCCH resource may indicate at least the index (set) of PRB on which the PUCCH is transmitted. The PUCCH resource may indicate at least a pattern of frequency hopping. The pattern of frequency hopping may include a configuration in which no frequency hopping is applied. The PUCCH resource may indicate at least a pattern of orthogonal sequences. The PUCCH resource may indicate at least a cyclic shift applied to UCI included in the PUCCH. The PUCCH resource may indicate at least a cyclic shift applied to an uplink reference signal associated with the PUCCH. The PUCCH resource may indicate at least a pattern of mapping (for example, a comb mapping, etc.) of the uplink reference signal associated with the PUCCH.

The one PUCCH resource may be given from the one PUCCH resource set, based on at least a prescribed field of DCI included in the PDCCH scheduling the PDSCH. For example, in a case that the one PUCCH resource set includes four PUCCH resources, and the prescribed field is two bits, each code point of the prescribed field may correspond to each of the four PUCCH resources.

In the condition 1, the control resource set may be identified based on at least the index of the control resource set. For example, a first PUCCH resource set may be given from the multiple PUCCH resource sets in a case that the identifier of the control resource set is #0 or #1, and a second PUCCH resource set may be given from the multiple PUCCH resource sets in a case that the identifier of the control resource set is #2.

In the condition 1, the control resource set may be identified by the monitoring periodicity of the control resource set. For example, a first PUCCH resource set may be given from the multiple PUCCH resource sets in a case that the monitoring periodicity of the control resource set is a first period, and a second PUCCH resource set may be given from the multiple PUCCH resource sets in a case that the monitoring periodicity of the control resource set is a second period.

In the condition 1, the control resource set may be identified based on at least the type of the control resource set. The type of the control resource set may at least include a common control resource set and a dedicated control resource set. For example, a first PUCCH resource set may be given from the multiple PUCCH resource sets in a case that the type of the control resource set is a common control resource set, and a second PUCCH resource set may be given from the multiple PUCCH resource sets in a case that the type of the control resource set is a dedicated control resource set.

In the condition 1, the control resource set may be identified based on at least some or all of the identifier of the control resource set, the monitoring periodicity of the control resource set, and the type of the control resource set.

In the condition 2, the search space may be identified based on at least the index of the search space. For example, a first PUCCH resource set may be given from the multiple PUCCH resource sets in a case that the identifier of the search space is #0 or #1, and a second PUCCH resource set may be given from the multiple PUCCH resource sets in a case that the identifier of the search space is #2.

In the condition 2, the search space may be identified by the monitoring periodicity of the search space. For example, a first PUCCH resource set may be given from the multiple PUCCH resource sets in a case that the monitoring periodicity of the search space is a first period, and a second PUCCH resource set may be given from the multiple PUCCH resource sets in a case that the monitoring periodicity of the search space is a second period.

In the condition 2, the search space may be identified based on at least the type of the search space. The type of the search space may include at least a common search space and a dedicated search space. For example, a first PUCCH resource set may be given from the multiple PUCCH resource sets in a case that the type of the search space is a common search space, and a second PUCCH resource set may be given from the multiple PUCCH resource sets in a case that the type of the search space is a dedicated search space.

In the condition 2, the search space may be identified based on at least some or all of the identifier of the search space, the monitoring periodicity of the search space, and the type of the search space.

In the condition 3, a first beam parameter for the PDSCH may be identified by an index of an antenna port of a downlink physical signal quasi co-located (QCLed) with an antenna port of the PDSCH. For example, a first PUCCH resource set may be given from the multiple PUCCH resource sets in a case that the antenna port of the PDSCH and the antenna port of the first downlink physical signal are QCLed, and a second PUCCH resource set may be given from the multiple PUCCH resource sets in a case that the antenna port of the PDSCH and the antenna port of the second downlink physical signal are QCLed. The first beam parameter for the PDSCH may be given based on at least the higher layer parameter. The first beam parameter for the PDSCH may be given based on at least a prescribed field of DCI included in the PDCCH scheduling the PDSCH.

The first beam parameter for the PDSCH may include at least some or all of following element 1 to element 7. The first beam parameter for the PDSCH may be associated with at least some or all of following element 1 to element 7.

Element 1) Index of an antenna port of the SS block quasi co-located (QCLed) with an antenna port of the PDSCH Element 2) Index of an antenna port of the CSI-RS quasi co-located (QCLed) with an antenna port of the PDSCH Element 3) Index of an antenna port of the DL PTRS quasi co-located (QCLed) with an antenna port of the PDSCH Element 4) Index of a DL DMRS group including at least the DL DMRS associated with the PDSCH Element 5) Configuration of physical resource mapping of the PDSCH Element 6) Index of an antenna port of the TRS quasi co-located (QCLed) with an antenna port of the PDSCH Element 7) Configuration of subcarrier spacing $\mu$ for the PDSCH In the element 5, the configuration of the physical resource mapping of the PDSCH may be at least a parameter for rate matching of the PDSCH. The parameter for the rate matching of the PDSCH may indicate resource elements to which the PDSCH is not mapped. The configuration of the physical resource mapping of the PDSCH may include at least some or all of the configuration of the mapping of the SS block, the configuration of the mapping of the CSI-RS, the configuration of the physical resource mapping of the PDSCH, and the configuration of the reservation resource. The configuration of the physical resource mapping of the PDSCH may include configuration indicating at least which CORESET is used for the PDSCH and/or which CORESET is not used for the PDSCH.

The configuration of the mapping of the SS block may indicate the actually transmitted SS block. A bitmap given for each group of one or more SS blocks may be used to indicate the actually transmitted SS block. The configuration of the mapping of the SS block may include a configuration of transmission periodicity of the SS block. The configuration of the mapping of the SS block may include a configuration $\mu$ of the subcarrier spacing of the SS block.

The configuration of the mapping of the CSI-RS may include a configuration of the number of antenna ports of the CSI-RS on which the transmission is configured. The configuration of the mapping of the CSI-RS may include a configuration indicating the CSI-RS on which the transmission is configured. The configuration of the mapping of the CSI-RS may include a configuration indicating transmission of a zero power CSI-RS. The zero power CSI-RS may be a CSI-RS assumed by the terminal apparatus 1 to be zero power. The configuration of the mapping of the CSI-RS may be a configuration indicating transmission of CSI-Interference Measurement (CSI-IM).

The configuration of the physical resource mapping of the PDSCH may include a configuration of a starting position of an OFDM symbol of the PDSCH. The configuration of the physical resource mapping of the PDSCH may include a configuration of resource elements to which the PDSCH is not mapped. The configuration of the physical resource mapping of the PDSCH may include a configuration of a termination position of an OFDM symbol of the PDSCH. The configuration of the physical resource mapping of the PDSCH may include a configuration of a duration of the PDSCH.

The configuration of the reservation resource may be a configuration of a resource element not assumed by the terminal apparatus 1 that any signal has been transmitted and/or that no signal has been transmitted.

The first beam parameter may be given from sets of one or more first beam parameters. The first beam parameter for the PDSCH may be given from the sets of the one or more first beam parameters, based on at least a prescribed field included in the DCI for scheduling the PDSCH. Each of the sets of the one or more first beam parameters may be given by the higher layer parameter.

In the condition 4, a second beam parameter for the PDCCH may be identified by an index of an antenna port of a downlink physical signal quasi co-located (QCLed) with an antenna port of the PDCCH. For example, a first PUCCH resource set may be given from the multiple PUCCH resource sets in a case that the antenna port of the PDCCH and the antenna port of the first downlink physical signal are QCLed, and a second PUCCH resource set may be given from the multiple PUCCH resource sets in a case that the antenna port of the PDCCH and the antenna port of the second downlink physical signal are QCLed. The second beam parameter for the PDCCH may be given based on at least the higher layer parameter. The second beam parameter may include at least some or all of the element 1 to the element 7.

The second beam parameter may be given from sets of one or more second beam parameters. The second beam parameter for the PDCCH may be given from the sets of the one or more second beam parameters, based on at least a prescribed field included in the DCI. Each of the sets of the one or more second beam parameters may be given by the higher layer parameter.

In the condition 5, a first PUCCH resource set may be given from the multiple PUCCH resource sets in a case that the HARQ process ID for the PDSCH is included in a set of the first HARQ process IDs, and a second PUCCH resource set may be given from the multiple PUCCH resource sets in a case that the HARQ process ID for the PDSCH is included in a set of the second HARQ process IDs. That is, in the condition 5, the one PUCCH resource set may be given based on at least a set of HARQ process IDs that include the HARQ process ID for the PDSCH.

In the condition 6, the third beam parameter for the PUCCH may be given based on at least the first beam parameter and/or the second beam parameter. The third beam parameter may include an index (SRS Resource Index (SRI)) to identify an SRS resource.

In a case that the PDCCH is detected in the common control resource set, regardless of some or all of the condition 1 through the condition 6, the one PUCCH resource set may be given from one PUCCH resource set defined in advance. In a case that the PDCCH is detected in the common control resource set, regardless of some or all of the condition 1 through the condition 6, the one PUCCH resource set may be given from the PUCCH resource set given based on higher layer parameters at least mapped to the BCCH or the CCCH. In a case that the PDCCH is detected in the common control resource set, regardless of some or all of the condition 1 through the condition 6, the one PUCCH resource may be given based on at least some or all of the slot number, the subframe number, the C-RNTI, and the index of the PDCCH on which the PDCCH is detected.

In a case that the PDCCH is detected in the common search space, regardless of some or all of the condition 1 through the condition 6, the one PUCCH resource set may be given from one PUCCH resource set defined in advance. In a case that the PDCCH is detected in the common search space, regardless of some or all of the condition 1 through the condition 6, the one PUCCH resource set may be given from the PUCCH resource set given based on higher layer parameters at least mapped to the BCCH or the CCCH. In a case that the PDCCH is detected in the common search space, regardless of some or all of the condition 1 through the condition 6, the one PUCCH resource may be given based on at least some or all of the slot number, the subframe number, the C-RNTI, and the index of the PDCCH on which the PDCCH is detected.

The terminal apparatus 1 may transmit a PUCCH including at least a HARQ-ACK of a PDSCH by using one PUCCH resource given by a PUCCH resource set. The PUCCH resource set may be associated with the first beam parameter for the PDSCH. The PUCCH resource set may be included in the first beam parameter for the PDSCH. The first beam parameter may be given from a set of one or more first beam parameters, based on at least the DCI included in the PDCCH used for the scheduling of the PDSCH. The first beam parameter may be given from a set of one or more first beam parameters, based on at least the higher layer parameter. The first parameter may include at least some or all of the element 1 to the element 7.

In a case that the PDCCH is detected in the common control resource set, regardless of the first beam parameter, the one PUCCH resource set may be given from one PUCCH resource set defined in advance. In a case that the PDCCH is detected in the common control resource set, regardless of the first beam parameter, the one PUCCH resource set may be given from the PUCCH resource set given based on higher layer parameters at least mapped to the BCCH or the CCCH. In a case that the PDCCH is detected in the common control resource set, regardless of the first beam parameter, the one PUCCH resource may be given based on at least some or all of the slot number, the subframe number, the C-RNTI, and the index of the PDCCH on which the PDCCH is detected.

In a case that the PDCCH is detected in the common search space, regardless of the first beam parameter, the one PUCCH resource set may be given from one PUCCH resource set defined in advance. In a case that the PDCCH is detected in the common search space, regardless of the first beam parameter, the one PUCCH resource set may be given from the PUCCH resource set given based on higher layer parameters at least mapped to the BCCH or the CCCH. In a case that the PDCCH is detected in the common search space, regardless of the first beam parameter, the one PUCCH resource may be given based on at least some or all of the slot number, the subframe number, the C-RNTI, and the index of the PDCCH on which the PDCCH is detected.

The terminal apparatus 1 may transmit a PUCCH including at least a HARQ-ACK of a PDSCH by using one PUCCH resource given by a PUCCH resource set. The PUCCH resource set may be associated with the second beam parameter for the PDCCH. The PUCCH resource set may be included in the second beam parameter for the PDCCH. The second beam parameter may be given from a set of one or more second beam parameters, based on at least the DCI included in the PDCCH to be used for the scheduling of the PDSCH. The second beam parameter may be given from a set of one or more second beam parameters, based on at least the higher layer parameter.

In a case that the PDCCH is detected in the common control resource set, regardless of the second beam parameter, the one PUCCH resource set may be given from one PUCCH resource set defined in advance. In a case that the PDCCH is detected in the common control resource set, regardless of the second beam parameter, the one PUCCH resource set may be given from the PUCCH resource set given based on higher layer parameters at least mapped to the BCCH or the CCCH. In a case that the PDCCH is detected in the common control resource set, regardless of the second beam parameter, the one PUCCH resource may be given based on at least some or all of the slot number, the subframe number, the C-RNTI, and the index of the PDCCH on which the PDCCH is detected.

In a case that the PDCCH is detected in the common search space, regardless of the second beam parameter, the one PUCCH resource set may be given from one PUCCH resource set defined in advance. In a case that the PDCCH is detected in the common search space, regardless of the second beam parameter, the one PUCCH resource set may be given from the PUCCH resource set given based on higher layer parameters at least mapped to the BCCH or the CCCH. In a case that the PDCCH is detected in the common search space, regardless of the second beam parameter, the one PUCCH resource may be given based on at least some or all of the slot number, the subframe number, the C-RNTI, and the index of the PDCCH on which the PDCCH is detected.

The terminal apparatus 1 may receive the PDSCH, based on at least detection of the PDCCH. The first beam parameter for the PDSCH may be given based on at least some or all of the condition 1, the condition 2, the condition 4, the condition 5, and the condition 6.

In a case that the PDCCH is detected in the common control resource set, regardless of some or all of the condition 1, the condition 2, the condition 4, the condition 5, and the condition 6, the first beam parameter for the PDSCH may be given based on at least the index of the SS block detected. The index of the SS block detected may be the index of the SS block including the PBCH successfully decoded at last.

In a case that the PDCCH is detected in the common search space, regardless of some or all of the condition 1, the condition 2, the condition 4, the condition 5, and the condition 6, the first beam parameter for the PDSCH may be given based on at least the index of the SS block detected. The index of the SS block detected may be the index of the SS block including the PBCH successfully decoded at last.

The terminal apparatus 1 may receive the PDSCH, based on at least detection of the PDCCH. The first beam parameter for the PDSCH may be given from a set including one or more first beam parameters, based on at least the PDCCH for scheduling the PDSCH and/or the higher layer parameter. Here, the set including the one or more first beam parameters is also referred to as a first set. The first set may be given from a collection including multiple first sets, based on at least some or all of the condition 1, the condition 2, the condition 4, the condition 5, and the condition 6.

In a case that the PDCCH is detected in the common control resource set, regardless of some or all of the condition 1, the condition 2, the condition 4, the condition 5, and the condition 6, the set including the first beam parameter may be a set including a first beam parameter defined in advance. In a case that the PDCCH is detected in the common control resource set, regardless of some or all of the condition 1, the condition 2, the condition 4, the condition 5, and the condition 6, the set including the first beam parameter may be given based on higher layer parameters at least mapped to the BCCH or the CCCH.

In a case that the PDCCH is detected in the common search space, regardless of some or all of the condition 1, the condition 2, the condition 4, the condition 5, and the condition 6, the set including the first beam parameter may be a set including a first beam parameter defined in advance. In a case that the PDCCH is detected in the common search space, regardless of some or all of the condition 1, the condition 2, the condition 4, the condition 5, and the condition 6, the set including the first beam parameter may be given based on higher layer parameters at least mapped to the BCCH or the CCCH.

A configuration example of the terminal apparatus 1 according to one aspect of the present embodiment will be described below.

Figure 12:
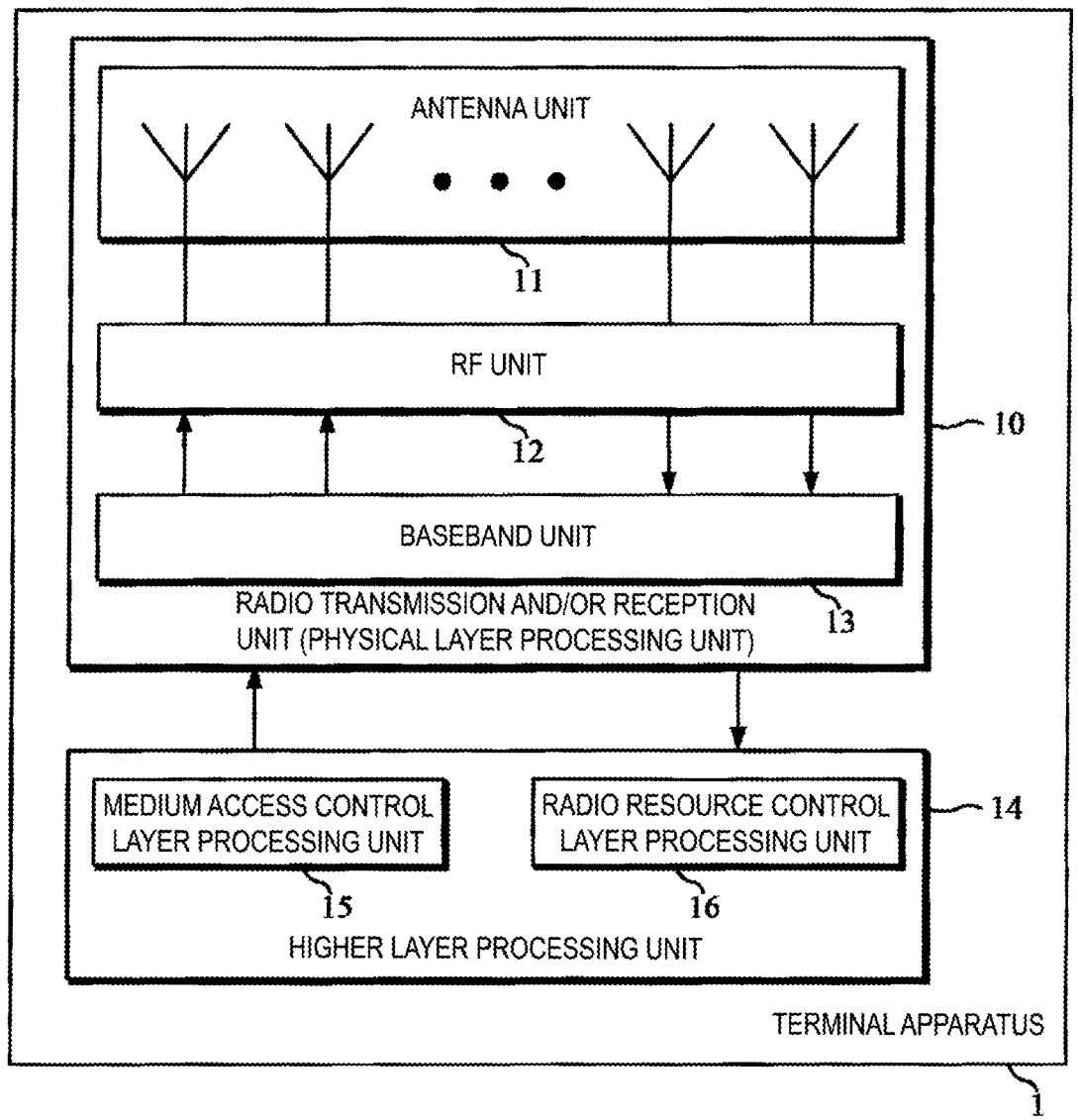
FIG. 12 is a schematic block diagram illustrating a configuration of a terminal apparatus 1 according to one aspect of the present embodiment.

FIG. 12 is a schematic block diagram illustrating a configuration of the terminal apparatus 1 according to an aspect of the present embodiment. As illustrated, the terminal apparatus 1 includes a radio transmission and/or reception unit 10 and a higher layer processing unit 14. The radio transmission and/or reception unit 10 includes at least some or all of an antenna unit 11, a Radio Frequency (RF) unit 12, and a baseband unit 13. The higher layer processing unit 14 includes at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters, based on a higher layer signal received from the base station apparatus 3. That is, the radio resource control layer processing unit 16 sets the various configuration information/parameters, based on the information for indicating the various configuration information/parameters received from the base station apparatus 3. The parameters may be a higher layer parameter.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating, coding data, and performing baseband signal generation (transforming to time continuous signals), and performs transmission to the base station apparatus 3.

The RF unit 12 converts (down-coverts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. The RF unit 12 amplifies power. The RF unit 12 may have a function of controlling transmit power. The RF unit 12 is also referred to as a transmit power control unit.

A configuration example of the base station apparatus 3 according to one aspect of the present embodiment will be described below.

Figure 13:
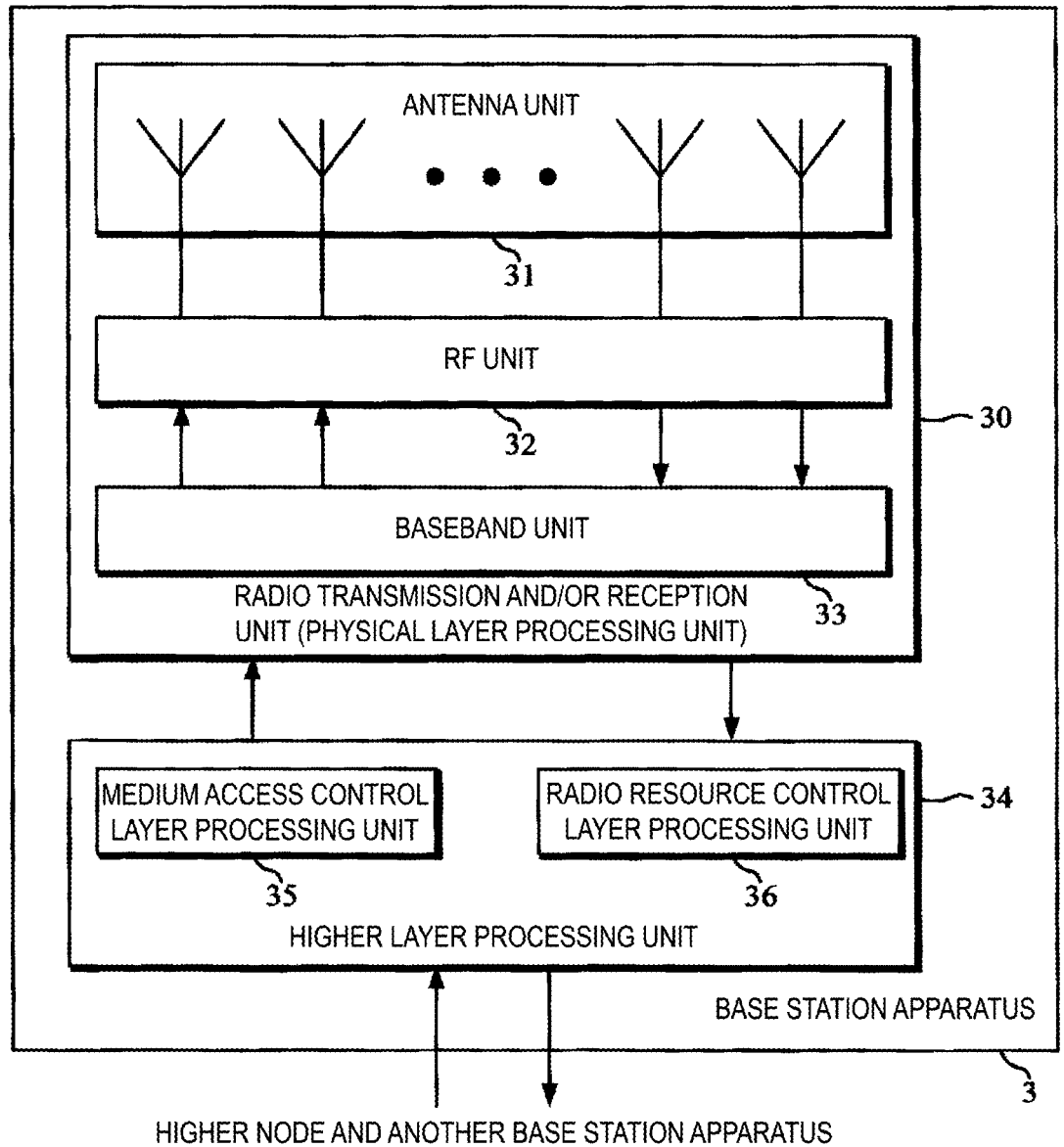
FIG. 13 is a schematic block diagram illustrating a configuration of a base station apparatus 3 according to one aspect of the present embodiment.

FIG. 13 is a schematic block diagram illustrating a configuration of the base station apparatus 3 according to one aspect of the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on PDSCH, system information, an RRC message, a MAC CE, and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of devices according to one aspect of the present embodiment will be described below.

(1) To accomplish the object described above, aspects of the present invention are contrived to provide the following measures. In other words, a first aspect of the present invention is a terminal apparatus including: a receiver configured to monitor a PDCCH in one or more CORESETs, and receive a PDSCH, based on detection of the PDCCH; and a transmitter configured to select one PUCCH resource from one PUCCH resource set, and transmit a HARQ-ACK for the PDSCH by using the one PUCCH resource, wherein the one PUCCH resource set is selected from multiple PUCCH resource sets associated with a PUCCH resource, based on at least some or all of a condition 1, a condition 2, a condition 3, a condition 4, and a condition 5, the condition 1 is a CORESET in which the PDCCH is detected, the condition 2 is a search space in which the PDCCH is detected, the condition 3 is a first beam parameter for the PDSCH, the condition 4 is a second beam parameter for the PDCCH, the condition 5 is a HARQ process ID associated with the PDSCH, and each of the multiple PUCCH resource sets includes one or more PUCCH resources.

(2) In the first aspect of the present invention, the first beam parameter includes at least some or all of a configuration at least used for resource element mapping for the PDSCH, and an index of an antenna port of a downlink reference signal quasi co-located (QCLed) with an antenna port of a DL DMRS associated with the PDSCH.

(3) In the first aspect of the present invention, the second beam parameter includes at least some or all of a configuration at least used for resource element mapping for the PDCCH, and an index of an antenna port of a downlink reference signal quasi co-located (QCLed) with an antenna port of a DL DMRS associated with the PDCCH.

(4) A second aspect of the present invention is a terminal apparatus including: a receiver configured to monitor a PDCCH in one or more CORESETs, and receive a PDSCH, based on detection of the PDCCH, wherein a first beam parameter for the PDSCH is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(5) In the second aspect of the present invention, the first beam parameter includes at least some or all of a configuration at least used for resource element mapping for the PDSCH, and an index of an antenna port of a downlink reference signal quasi co-located (QCLed) with an antenna port of a DL DMRS associated with the PDSCH.

(6) In the second aspect of the present invention, the second beam parameter includes at least some or all of a configuration at least used for resource element mapping for the PDCCH, and an index of an antenna port of a downlink reference signal quasi co-located (QCLed) with an antenna port of a DL DMRS associated with the PDCCH.

(7) A third aspect of the present invention is a terminal apparatus including: a receiver configured to monitor a PDCCH in one or more CORESETs, and receive a PDSCH, based on detection of the PDCCH, wherein one first beam parameter for the PDSCH is selected from one beam parameter set, the one beam parameter set is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(8) In the third aspect of the present invention, the first beam parameter includes at least some or all of a configuration at least used for resource element mapping for the PDSCH, and an index of an antenna port of a downlink reference signal quasi co-located (QCLed) with an antenna port of a DL DMRS associated with the PDSCH.

(9) In the third aspect of the present invention, the second beam parameter includes at least some or all of a configuration at least used for resource element mapping for the PDCCH, and an index of an antenna port of a downlink reference signal quasi co-located (QCLed) with an antenna port of a DL DMRS associated with the PDCCH.

(10) A fourth aspect of the present invention is a base station apparatus including: a transmitter configured to transmit a PDSCH, and transmit a PDCCH including scheduling information of the PDSCH in a CORESET; and a receiver configured to receive a PUCCH transmitted by using one PUCCH resource selected from one PUCCH resource set and including a HARQ-ACK for the PDSCH, wherein the one PUCCH resource set is selected from multiple PUCCH resource sets associated with a PUCCH resource, based on at least some or all of a condition 1, a condition 2, a condition 3, a condition 4, and a condition 5, the condition 1 is a CORESET in which the PDCCH is detected, the condition 2 is a search space in which the PDCCH is detected, the condition 3 is a first beam parameter for the PDSCH, the condition 4 is a second beam parameter for the PDCCH, the condition 5 is a HARQ process ID associated with the PDSCH, and each of the multiple PUCCH resource sets includes one or more PUCCH resources.

(11) In the fourth aspect of the present invention, the first beam parameter includes at least some or all of a configuration at least used for resource element mapping for the PDSCH, and an index of an antenna port of a downlink reference signal quasi co-located (QCLed) with an antenna port of a DL DMRS associated with the PDSCH.

(12) In the fourth aspect of the present invention, the second beam parameter includes at least some or all of a configuration at least used for resource element mapping for the PDCCH, and an index of an antenna port of a downlink reference signal quasi co-located (QCLed) with an antenna port of a DL DMRS associated with the PDCCH.

(13) A fifth aspect of the present invention is a base station apparatus including: a transmitter configured to transmit a PDSCH, and transmit a PDCCH including scheduling information of the PDSCH in a CORESET, wherein a first beam parameter for the PDSCH is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(14) In the fifth aspect of the present invention, the first beam parameter includes at least some or all of a configuration at least used for resource element mapping for the PDSCH, and an index of an antenna port of a downlink reference signal quasi co-located (QCLed) with an antenna port of a DL DMRS associated with the PDSCH.

(15) In the fifth aspect of the present invention, the second beam parameter includes at least some or all of a configuration at least used for resource element mapping for the PDCCH, and an index of an antenna port of a downlink reference signal quasi co-located (QCLed) with an antenna port of a DL DMRS associated with the PDCCH.

(16) A sixth aspect of the present invention is a base station apparatus including: a transmitter configured to transmit a PDSCH, and transmit a PDCCH including scheduling information of the PDSCH in a CORESET, wherein one first beam parameter for the PDSCH is selected from one beam parameter set, the one beam parameter set is given based on at least some or all of a condition 1, a condition 2, and a condition 3, the condition 1 is a CORESET in which the PDCCH is detected, the condition 2 is a search space in which the PDCCH is detected, and the condition 3 is a second beam parameter for the PDCCH.

(17) In the sixth aspect of the present invention, the first beam parameter includes at least some or all of a configuration at least used for resource element mapping for the PDSCH, and an index of an antenna port of a downlink reference signal quasi co-located (QCLed) with an antenna port of a DL DMRS associated with the PDSCH.

(18) In the sixth aspect of the present invention, the second beam parameter includes at least some or all of a configuration at least used for resource element mapping for the PDCCH, and an index of an antenna port of a downlink reference signal quasi co-located (QCLed) with an antenna port of a DL DMRS associated with the PDCCH.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:
1. A terminal device comprising:
reception circuitry configured to monitor a PDCCH (Physical Downlink Control CHannel) including a DCI (Downlink Control Information) used for scheduling of a PDSCH (Physical Downlink Shared CHannel) in a first control resource set and in a second control resource set, and receive the PDSCH; and
transmission circuitry configured to transmit a HARQ-ACK in a PUCCH (Physical Uplink Control CHannel), wherein
the first control resource set is associated with a first beam parameter,
the first beam parameter for the PDSCH includes an index of a first antenna port of a first CSI-RS (Channel State Information-Reference Signal) quasi co-located with the first antenna port of the PDSCH or an index of a first SS (Synchronization signal) block quasi co-located with the first antenna port of the PDSCH,
the second control resource set is associated with a second beam parameter,
the second beam parameter for the PDCCH includes an index of a second antenna port of a second CSI-RS quasi co-located with a second antenna port of the PDSCH or an index of the second antenna port of a second SS block quasi co-located with the second antenna port of the PDSCH,
a third beam parameter for the PDCCH is selected from a set of beam parameters including the first beam parameter and the second beam parameter, where the set of the beam parameters is given based on a higher layer parameter received by the terminal device, and
a fourth beam parameter for the PDSCH is selected based on the selected third beam parameter for the PDCCH.
2. A base station device comprising:
transmission circuitry configured to transmit a PDCCH (Physical Downlink Control CHannel) including a DCI

(Downlink Control Information) used for scheduling of a PDSCH (Physical Downlink Shared CHannel) in a first control resource set and in a second control resource set, and transmit the PDSCH; and reception circuitry configured to receive a HARQ-ACK in a PUCCH (Physical Uplink Control CHannel), wherein the first control resource set is associated with a first beam parameter, the first beam parameter for the PDSCH includes an index of a first antenna port of a first CSI-RS (Channel State Information-Reference Signal) quasi co-located with the first antenna port of the PDSCH or an index of a first SS (Synchronization signal) block quasi co-located with the first antenna port of the PDSCH, the second control resource set is associated with a second beam parameter, the second beam parameter for the PDCCH includes an index of a second antenna port of a second CSI-RS quasi co-located with the second antenna port of the PDSCH or an index of the second antenna port of a second SS block quasi co-located with the second antenna port of the PDSCH, a third beam parameter for the PDCCH is selected from a set of beam parameters including the first beam parameter and the second beam parameter, where the set of the beam parameters is given based on a higher layer parameter received by a terminal device, and a fourth beam parameter for the PDSCH is selected based on the selected third beam parameter for the PDCCH.

3. A communication method used for a terminal device, the communication method comprising:

monitoring a PDCCH (Physical Downlink Control CHannel) including a DCI (Downlink Control Information) used for scheduling of a PDSCH (Physical Downlink Shared CHannel) in a first control resource set and in a second control resource set, and receive the PDSCH, and transmitting a HARQ-ACK in a PUCCH (Physical Uplink Control CHannel), wherein the first control resource set is associated with a first beam parameter, the first beam parameter for the PDSCH includes an index of a first antenna port of a first CSI-RS (Channel State Information-Reference Signal) quasi co-located with the first antenna port of the PDSCH or an index of a first SS (Synchronization signal) block quasi co-located with the first antenna port of the PDSCH, the second control resource set is associated with a second beam parameter, the second beam parameter for the PDCCH includes an index of a second antenna port of a second CSI-RS quasi co-located with the second antenna port of the PDSCH or an index of the second antenna port of a second SS block quasi co-located with the second antenna port of the PDSCH, a third beam parameter for the PDCCH is selected from a set of beam parameters including the first beam parameter and the second beam parameter, where the set of the beam parameters is given based on a higher layer parameter received by the terminal device, and a fourth beam parameter for the PDSCH is selected based on the selected third beam parameter for the PDCCH.

4. A communication method used for a base station device, the communication method comprising:

transmitting a PDCCH (Physical Downlink Control CHannel) including a DCI (Downlink Control Information) used for scheduling of a PDSCH (Physical Downlink Shared CHannel) in a first control resource set and in a second control resource set, and transmit the PDSCH; and receiving a HARQ-ACK in a PUCCH (Physical Uplink Control CHannel), wherein the first control resource set is associated with a first beam parameter, the first beam parameter for the PDSCH includes an index of a first antenna port of a first CSI-RS (Channel State Information-Reference Signal) quasi co-located with the first antenna port of the PDSCH or an index of a first SS (Synchronization signal) block quasi co-located with the first antenna port of the PDSCH, the second control resource set is associated with a second beam parameter, the second beam parameter for the PDCCH includes an index of a second antenna port of a second CSI-RS quasi co-located with the second antenna port of the PDSCH or an index of the second antenna port of a second SS block quasi co-located with the second antenna port of the PDSCH, a third beam parameter for the PDCCH is selected from a set of beam parameters including the first beam parameter and the second beam parameter, where the set of the beam parameters is given based on a higher layer parameter received by a terminal device, and a fourth beam parameter for the PDSCH is selected based on the selected third beam parameter for the PDCCH.

* * * * *